(12) United States Patent
Celik

(10) Patent No.: US 7,769,368 B2
(45) Date of Patent: Aug. 3, 2010

(54) WIRELESS DATA EXCHANGE

(75) Inventor: Feyzi Celik, Hopkinton, MA (US)

(73) Assignee: One Pin, LLC, Westborough, MA (US)

( * ) Notice: Subject to any disclaimer, the term of this patent is extended or adjusted under 35 U.S.C. 154(b) by 0 days.

(21) Appl. No.: 12/423,717

(22) Filed: Apr. 14, 2009

(65) Prior Publication Data

US 2009/0227243 A1 Sep. 10, 2009

Related U.S. Application Data

(62) Division of application No. 11/353,452, filed on Feb. 13, 2006.

(60) Provisional application No. 60/662,462, filed on Mar. 15, 2005.

(51) Int. Cl.
*H04W 88/02* (2009.01)

(52) U.S. Cl. ..................................................... 455/415

(58) Field of Classification Search ............... 707/8–10, 707/101–102, 104.1; 455/412, 416, 419, 455/422.1; 370/271; 380/33
See application file for complete search history.

(56) References Cited

U.S. PATENT DOCUMENTS

| | | | |
|---|---|---|---|
| 4,654,793 A | 3/1987 | Elrod | |
| 4,774,618 A | 9/1988 | Raviv | |
| 4,945,218 A | 7/1990 | Talbott | |
| 5,483,052 A | 1/1996 | Smith, III et al. | |
| 5,493,105 A | 2/1996 | Desai | |
| 5,590,197 A | 12/1996 | Chen et al. | |
| 5,604,640 A | 2/1997 | Zipf et al. | |
| 5,612,524 A | 3/1997 | Sant'Anselmo et al. | |
| 5,640,565 A | 6/1997 | Dickinson | |
| 5,671,279 A | 9/1997 | Elgamal | |
| 5,671,282 A | 9/1997 | Wolff et al. | |
| 5,678,041 A | 10/1997 | Baker et al. | |
| 5,689,654 A | 11/1997 | Kikinis et al. | |
| 5,692,073 A | 11/1997 | Cass | |
| 5,715,399 A | 2/1998 | Bezos | |
| 5,732,229 A | 3/1998 | Dickinson | |
| 5,740,549 A | 4/1998 | Reilly et al. | |
| 5,774,117 A | 6/1998 | Kukkal et al. | |
| 5,791,991 A | 8/1998 | Small | |

(Continued)

FOREIGN PATENT DOCUMENTS

CN   1589046   3/2005

(Continued)

OTHER PUBLICATIONS

U.S. Appl. No. 12/423,711, filed Apr. 14, 2009, Celik.

(Continued)

*Primary Examiner*—Diane Mizrahi
(74) *Attorney, Agent, or Firm*—Mintz Levin Cohn Ferris Glovsky and Popeo, P.C.

(57) ABSTRACT

A system of exchanging and managing information includes a mobile device configured to automatically insert, exchange and update a caller's contact information into a user's phonebook. The phonebook can reside on either the UICC card, SIM, USIM, Mega SIM, any other smart card or an integrated chip, on the mobile device or on a remote server. The automatic insert and/or automatic exchange mechanism is triggered when a call is made between two people on mobile phones or other devices.

12 Claims, 27 Drawing Sheets

U.S. PATENT DOCUMENTS

| | | | |
|---|---|---|---|
| 5,793,972 | A | 8/1998 | Shane |
| 5,794,219 | A | 8/1998 | Brown |
| 5,794,232 | A | 8/1998 | Mahlum et al. |
| 5,806,043 | A | 9/1998 | Toader |
| 5,848,412 | A | 12/1998 | Rowland et al. |
| 5,878,397 | A | 3/1999 | Stille et al. |
| 5,987,136 | A | 11/1999 | Schipper et al. |
| 6,092,133 | A | 7/2000 | Erola et al. |
| 6,094,573 | A | 7/2000 | Heinonen et al. |
| 6,115,711 | A | 9/2000 | White |
| 6,149,263 | A | 11/2000 | Nakano |
| 6,161,113 | A | 12/2000 | Mora et al. |
| 6,161,124 | A | 12/2000 | Takagawa et al. |
| 6,183,377 | B1 | 2/2001 | Liang |
| 6,185,553 | B1 | 2/2001 | Byrd et al. |
| 6,346,881 | B1 | 2/2002 | Davidson |
| 6,374,259 | B1 | 4/2002 | Celik |
| 6,433,795 | B1 | 8/2002 | MacNaughton et al. |
| 6,459,904 | B1 | 10/2002 | Lorello et al. |
| 6,564,261 | B1 | 5/2003 | Gudjonsson et al. |
| 6,615,057 | B1 * | 9/2003 | Pettersson ............... 455/558 |
| 6,654,768 | B2 | 11/2003 | Celik |
| 6,810,405 | B1 * | 10/2004 | LaRue et al. ............. 707/201 |
| 6,859,650 | B1 | 2/2005 | Ritter |
| 6,859,829 | B1 | 2/2005 | Parupudi et al. |
| 6,868,451 | B1 | 3/2005 | Peacock |
| 6,973,477 | B1 | 12/2005 | Martino |
| 7,146,165 | B2 | 12/2006 | Manner et al. |
| 7,222,147 | B1 | 5/2007 | Black et al. |
| 7,225,244 | B2 | 5/2007 | Reynolds et al. |
| 7,296,036 | B2 | 11/2007 | Celik |
| 7,349,907 | B2 | 3/2008 | Celik |
| 7,353,044 | B2 | 4/2008 | Nachef |
| 7,447,510 | B2 | 11/2008 | Celik et al. |
| 7,509,349 | B2 | 3/2009 | Celik |
| 2001/0044321 | A1 | 11/2001 | Ausems et al. |
| 2003/0009374 | A1 | 1/2003 | Moodie et al. |
| 2003/0009385 | A1 | 1/2003 | Tucciarone et al. |
| 2003/0022697 | A1 * | 1/2003 | Chen et al. ............... 455/564 |
| 2003/0073440 | A1 | 4/2003 | Mukherjee et al. |
| 2003/0083078 | A1 | 5/2003 | Allison et al. |
| 2003/0163598 | A1 | 8/2003 | Wilson et al. |
| 2004/0024846 | A1 | 2/2004 | Randall et al. |
| 2004/0093317 | A1 | 5/2004 | Swan |
| 2004/0199598 | A1 | 10/2004 | Kalfas |
| 2004/0235503 | A1 | 11/2004 | Koponen et al. |
| 2004/0249846 | A1 | 12/2004 | Randall et al. |
| 2005/0021571 | A1 | 1/2005 | East |
| 2005/0047582 | A1 | 3/2005 | Shaffer et al. |
| 2005/0102328 | A1 | 5/2005 | Ring et al. |
| 2005/0117523 | A1 | 6/2005 | Parupudi et al. |
| 2005/0122909 | A1 | 6/2005 | Parupudi et al. |
| 2005/0122910 | A1 | 6/2005 | Parupudi et al. |
| 2005/0149487 | A1 | 7/2005 | Celik |
| 2005/0208927 | A1 | 9/2005 | Wong et al. |
| 2006/0031237 | A1 * | 2/2006 | DeAnna et al. ............. 707/100 |
| 2006/0041590 | A1 * | 2/2006 | King et al. ............... 707/104.1 |
| 2006/0089130 | A1 | 4/2006 | Yamamura et al. |
| 2006/0101266 | A1 | 5/2006 | Klassen et al. |
| 2006/0212482 | A1 | 9/2006 | Celik |
| 2006/0235931 | A1 | 10/2006 | Ruthe et al. |
| 2006/0290496 | A1 | 12/2006 | Peeters |
| 2007/0021111 | A1 | 1/2007 | Celik |
| 2007/0181675 | A1 | 8/2007 | Drummond et al. |
| 2008/0015998 | A1 | 1/2008 | Celik |
| 2008/0032742 | A1 | 2/2008 | Celik et al. |
| 2008/0090597 | A1 | 4/2008 | Celik et al. |
| 2008/0257952 | A1 | 10/2008 | Zandonadi |
| 2008/0261577 | A1 | 10/2008 | Celik et al. |
| 2009/0042590 | A1 | 2/2009 | Celik et al. |
| 2009/0119339 | A1 | 5/2009 | Celik |
| 2009/0176485 | A1 * | 7/2009 | Michaels et al. ............ 455/419 |

FOREIGN PATENT DOCUMENTS

| | | |
|---|---|---|
| EP | 1677186 A1 | 7/2006 |
| WO | WO-9701137 A1 | 1/1997 |
| WO | WO-9803923 A1 | 1/1998 |
| WO | WO-9806055 A1 | 2/1998 |
| WO | WO-9824036 A1 | 6/1998 |
| WO | WO-9929127 A1 | 6/1999 |
| WO | WO-0239300 A1 | 5/2002 |
| WO | WO-2006011995 A2 | 2/2006 |
| WO | WO-2006088627 A2 | 8/2006 |
| WO | WO-2007031708 A1 | 3/2007 |
| WO | WO-2007094823 A1 | 8/2007 |
| WO | WO-2008016553 A2 | 2/2008 |
| WO | WO-2008051276 A2 | 5/2008 |
| WO | WO-2008057349 A2 | 5/2008 |
| WO | WO-2008130653 A1 | 10/2008 |

OTHER PUBLICATIONS

U.S. Appl. No. 12/423,715, filed Apr. 14, 2009, Celik.
U.S. Appl. No. 12/423,717, filed Apr. 14, 2009, Celik.
U.S. Appl. No. 60/102,614, filed Oct. 1, 1998, Celik.
U.S. Appl. No. 60/862,453, filed Oct. 22, 2006, Celik.
U.S. Appl. No. 60/863,899, filed Nov. 1, 2006, Celik.
U.S. Appl. No. 60/913,187, filed Apr. 20, 2007, Celik.
U.S. Appl. No. 61/109,722, filed Oct. 30, 2008, Celik.
Dawson et al., "vCard MIME Directory Profile; rfc2426.txt", IETF Standard, Internet Engineering Task Force, IETF, CH, pp. 1-41 (1998).
ETSI Standards, European Telecommunications Standards Institute, Sophia-Antipo, FR, "Digital cellular telecommunications system (Phase 2+); Universal Mobile Telecommunications System (UMTS); Technical realization of Short Message Service (SMS) (3GPP TS 23.040 version 6.6.0 Release 6); ETSI TS 123 040", 3-T2(V660):1-195 (2005).
ETSI Standards, European Telecommunications Standards Institute, Sophia-Antipo, FR, "Smart cards; ETSI numbering system for telecommunications application providers (Release 7); ETSI TS 101 220", SCP-WG1(V740):1-27 (2006).
George Kambourakis et al., "Delivering Attribute Certificates over GPRS", 2004, ACM, NY, NY, pp. 1166-1170.
Howes et al., "A MIME Content-Type for Directory Information; RFC2425.txt", IETF Standard, Internet Engineering Task Force, IETF, CH, pp. 1-33 (1998).
International Search Report for PCT/US06/38589, mailed Apr. 30, 2007.
International Search Report for PCT/US2006/009262, mailed Mar. 31, 2009.
Ulrike Meyer et al., "A man-in-the-middle attack on UMTS", 2004, ACM, NY, NY, pp. 90-97.
Versit Consortium, "vCard—The Electronic Business Card—Version 2.1—Specifications", Internet citation, [Online] Sep. 18, 1996, XP002318282, retrieved from Internet: URL:http://www.imc.org/pdi/vacrd-21.doc[retrieved on Feb. 18, 2005], pp. 1-40.

* cited by examiner

WIRELESS DATA EXCHANGE

RELATED APPLICATIONS

This application is a divisional of U.S. application Ser. No. 11/353,452, filed Feb. 13, 2006, which is incorporated herein by reference. U.S. application Ser. No. 11/353,452 also claims priority to U.S. Provisional Patent Application Ser. No. 60/662,462 filed Mar. 15, 2005 and entitled, "Wireless Data Exchange." U.S. application Ser. No. 11/353,452 also claims priority to U.S. Ser. No. 11/056,022, filed on Feb. 11, 2005, which is a continuation-in-part of patent application U.S. Ser. No. 10/879,331, filed Jun. 29, 2004, which is a continuation-in-part of patent application U.S. Ser. No. 10/657,757, filed Sep. 8, 2003, which is a continuation of patent application U.S. Ser. No. 09/223,129, filed Dec. 30, 1998, now U.S. Pat. No. 6,374,259, which claims priority from U.S. Ser. No. 60/102,614, filed Oct. 1, 1998 (Abandoned), each of which is incorporated herein by reference.

BACKGROUND OF INVENTION

The phonebook plays a significant role in mobile communications. It is the source of the contact information for phone calls, text messages, faxes, instant messages and emails. A challenge in the mobile phone market is inserting, updating, and maintaining contact information stored in the phonebook. Currently, one must manually enter phone numbers into one's mobile phone. This takes time, is often difficult with such small buttons and screens on phones, and is prone to errors with manual data entry. Often, the result is that many individuals do not enter contact information in their mobile phonebooks.

In addition, these problems restrict the user from adding alternate phone numbers (e.g. business phone, home phone, and fax) associated with a contact, even though today's phonebooks can support multiple numbers. With the growth of more sophisticated phones (e.g. Smart Phones, IP phones, and Internet capable phones) there is also a need to store email addresses and Instant Message (IM) addresses of contacts. Entering email and IM addresses, however, can be even more problematic than entering phone numbers.

Another problem for users today is the inability to control the distribution of contact information to others. For example, one might provide a mobile phone number or business telephone number to another person but not want to provide their home telephone number. Thus, users continue to face many problems in using and benefiting from the capabilities of a device phonebook.

SUMMARY OF THE INVENTION

Embodiments of the invention provide systems, methods, and device enhancements to automatically insert, exchange and update a caller's contact information into a user's phonebook. The phonebook can reside on either the UICC card (Subscriber Interface Module ("SIM"), USIM, Mega SIM, any other smart card or an integrated chip), on the mobile device or on a remote server, for example. The automatic insert and/or automatic exchange mechanism is triggered when a call is made between two people on mobile phones or other devices. Upon call completion, a caller is asked if the caller wants to send updated information to a call recipient. If yes, the information is automatically sent to the recipient, based upon the permission settings provided by the sender, or caller. The recipient has the option of receiving the new information at his or her device. Thus, an embodiment of the invention comprises an information management system having a first user device having at least one of a Subscriber Identity Module, a UMTS Subscriber Identity Module, a smart card or an embedded chip, a second user device configured to interface with the first user device over a wireless network, and an application module configured to enable the first user device to retrieve information associated with the second user device over the wireless network upon a communication between the first user device and the second user device.

Implementations of the invention can include one or more of the following features. The system and methods of the invention may include AutoInsert/AutoExchange between two mobile phones with a call triggering the sending of contact information to a phone or other personal device. AutoInsert/AutoExchange may occur between two mobile phones with a phone call triggering the mobile network switch to prepare and distribute messages to the mobile phones. The messages process contact information exchange between two or more than two mobile phonebooks. Further, AutoInsert/AutoExchange may occur between two mobile phones utilizing the existing OnePIN™ technology that utilize a procedure covered under U.S. Pat. Nos. 6,374,259 and 6,654,768.

Features of the invention may provide one or more of the following advantages. The process may alleviate storage issues and processing power issues. The system and processes of the invention may assist in the integration issues of a Mobile Operator Network. Exchange of information between users on a network can be automated. Updates to information stored on a mobile device can be achieved automatically, or with manual entry by choice. Other capabilities will be apparent upon review of the following figures and description.

FIGURES

DETAIL DESCRIPTION OF THE INVENTION

Embodiments of the present invention are directed generally to a method and an apparatus for inserting, exchanging, updating and storing contact information in a mobile phone used over a mobile network. Embodiments of the invention can be used to insert, exchange, update or store information other than, or in addition to, contact information. Further embodiments of the invention can be used for devices other than mobile phones, and over networks other than mobile networks. Implementations of the invention are described as employing SIM. It is understood that SIM cards includes, but is not limited to, SIM, (U)SIM, Mega SIM, smart cards, and other applications, for example.

Figure 1:
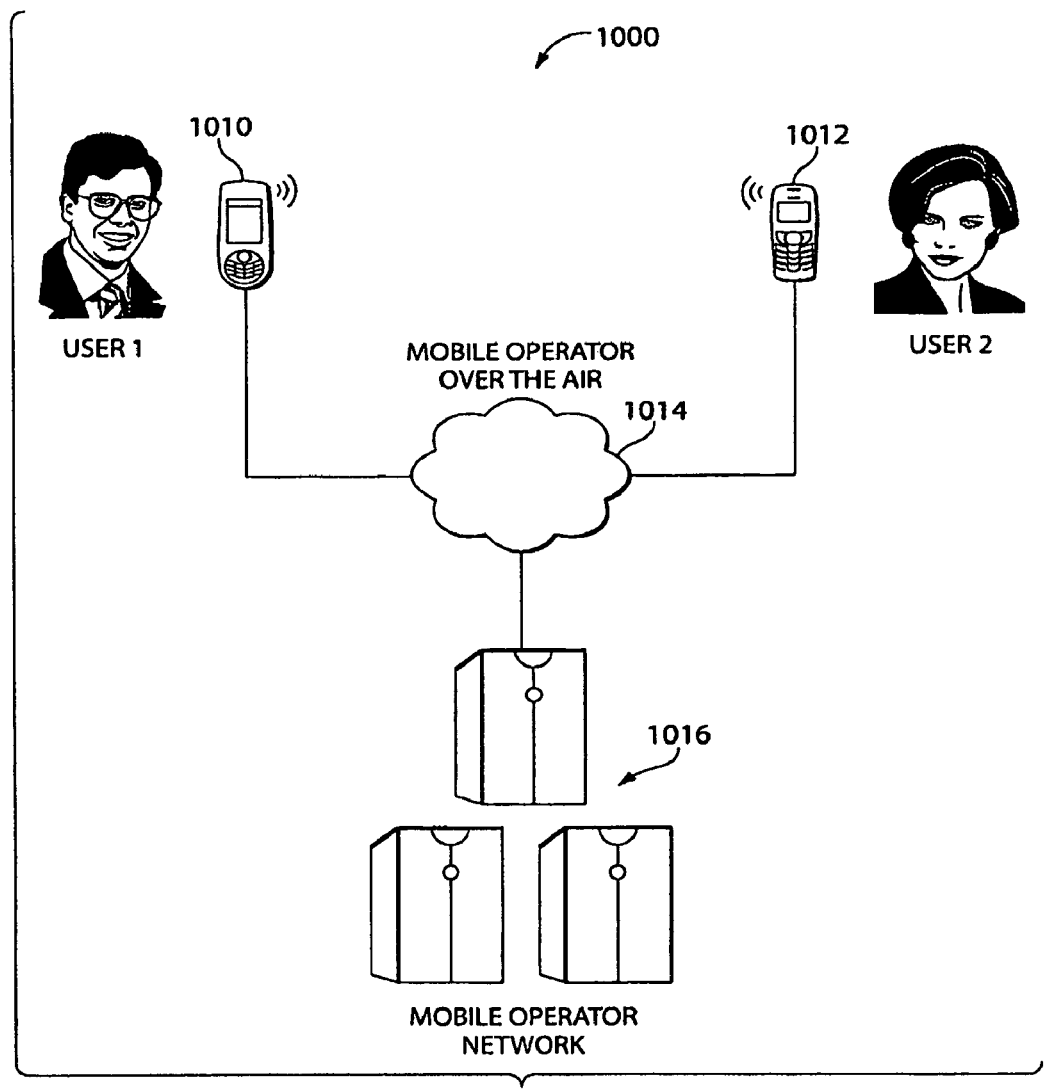
FIG. 1 is a schematic of a communication system according to one embodiment of the invention.

Referring to FIG. 1, a mobile contact management information system 1000 includes a first user phone 1010, a second user phone 1012, and a Mobile Operator Over The Air (OTA) communication platform 1014 on a mobile operator's network 1016. The contact management information system 1000 is an UMTS Mobile Operator Network, for example. The system 1000 can be another type of mobile network, such as WCDMA (GSM), CDMA, CDMA2000, etc or a next generation phone system.

Figure 2:
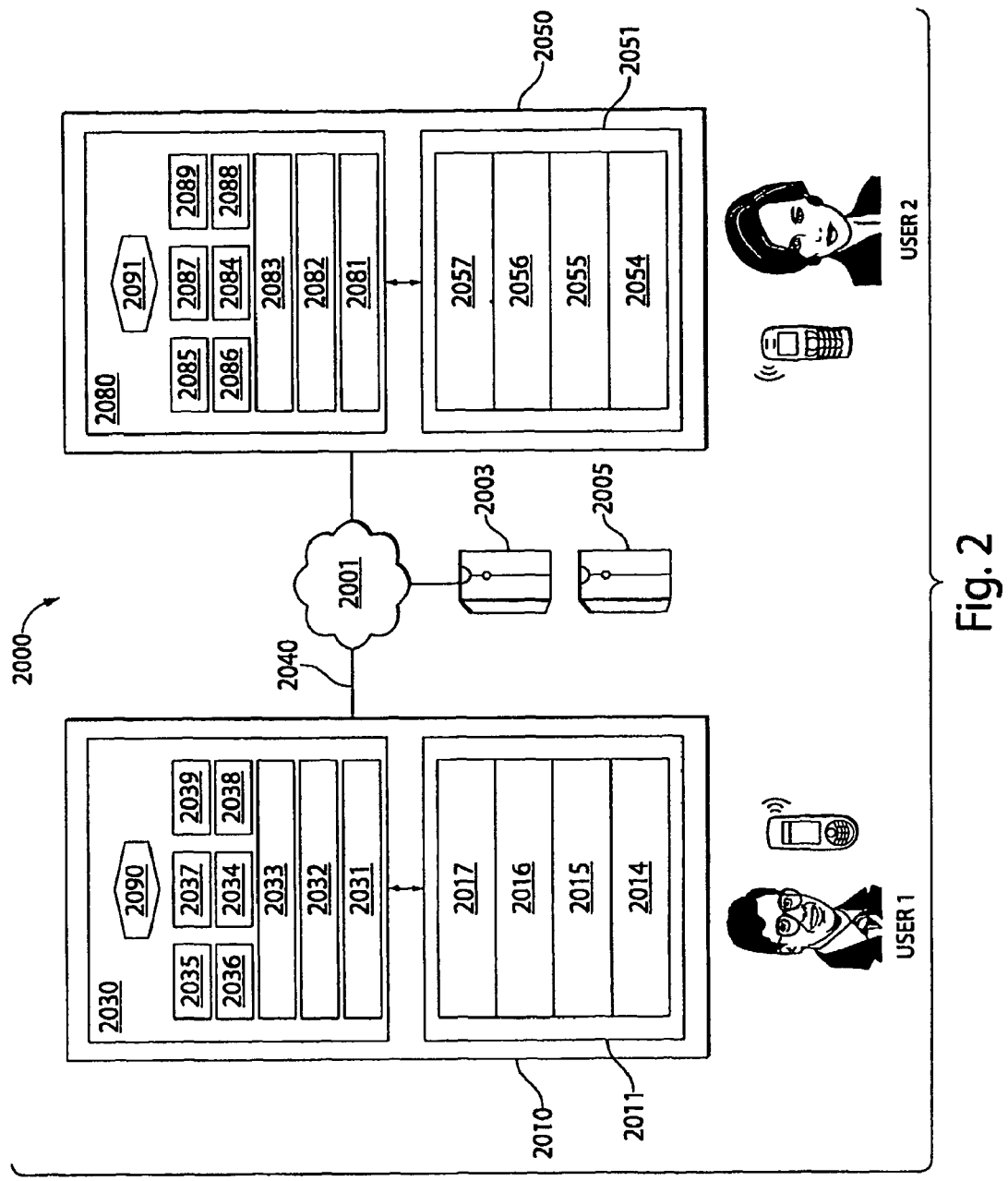
FIG. 2 is a schematic diagram of a communication system according to one embodiment of the invention.

Referring to FIG. 2, a mobile contact management information system 2000 includes a first user phone 2010, a second user phone 2050, a remote computer 2003, a remote database server 2005, and an OTA communication platform 2001. The remote computer 2003 and the remote database 2005 can be a part of the Mobile Operator network, for example. The remote computer 2003 is coupled to the remote database 2005. The first user phone 2010 and the second user phone 2050 are connected to the OTA platform 2001. The OTA platform 2001 connects the first user phone 2010 and the second user phone 2050 to the remote computer 2003 and the remote database server 2005 over the mobile network.

The first user phone 2010 includes a UICC card 2030 and a phone operating system 2011. The UICC card 2030 includes a (U)SIM application module 2090, a Javacard 2031 and a SIM Tool Kit (STK) framework 2032, and a first user UICC card phonebook 2033. The UICC card 2030 also stores a first user MyProfile Data File 2035, a first User Last Number Dialed (LND) data file 2037, a first User LND Pattern data file 2038, a first User Operations Mode data file 2034, and a first User Configuration File 2039. The files 2034, 2035, 2036, 2037, 2038 and 2039 can be changed locally or remotely via an OTA update. The phone operating system 2011 includes a display control module 2017, a phonebook module 2015, a phone event management communication module 2014, and a SMS module 2016. The phone operating system may include other modules.

The second user phone 2050 includes a UICC card 2080 and an operating system 2051. The second user UICC card 2080 includes a (U)SIM application module 2091, a Javacard 2081, a SIM Tool Kit (STK) framework 2082, and a second user UICC card phonebook 2083. The SIM File System stores a second user MyProfile Data File 2085, a second User Last Number Dialed (LND) data file 2087, a second User LND Pattern data file 2088, a second User Operations Mode data file 2084, and a second User Configuration File 2089. The files 2084, 2085, 2086, 2087, 2088, 2089 can be changed locally or remotely via an OTA update. The second user phone operating system 2051 includes a display control module 2057, a phonebook module 2055, a phone event management communication module 2054, and a SMS module 2056. The phone operating system may include other modules.

The UICC cards 2030 and 2080 are integrated into the respective phone and phone operating system software for each of the user phone 2010 and the user phone 2050. The UICC card 2030 and the UICC card 2080 enable the first user phone 2010 and the second user phone 2050 to access the remote server 2003 and the remote database 2005 over the mobile network, OTA Platform 2001 and phone operator network. The (U)SIM application modules 2090 and 2091 are installed on each phone's operating system or can be programmed into the firmware of each phone. In this case, for example, the (U)SIM application module 2090 becomes a phone dependant software application rather than a UICC card application.

The (U)SIM application modules 2090, 2091 and the UICC card phonebooks 2033, 2083 of the first user phone 2010 and the second user phone 2050 can be combined such that both are deployed as a single software program. The UICC cards 2030 and 2080 can also be a different type of information storage and execution medium such as a communication chip or a variation of a UICC or Smart Card. The UICC cards 2030 and 2080 can also be another integrated smart card or chip within a phone. The UICC phonebooks 2033, 2083 may be replaced with another type of file or software program to manage the contact entries and other personalized items.

The (U)SIM application module 2090 is saved on the UICC card 2030. The module 2090 listens for phone call related events, sends requests to the other phones, receives caller information, and inserts contact information into the UICC phonebook 2033 or on the phone itself. Additional features can include: software activation, personal information update, default access level setting, phonebook backup and restore. The application module 2090 is compatible with 2G and 3G specifications, specifically: 3GPP TS 31.111 (Release 6) "USIM Application Toolkit (USAT)", 3GPP TS 31.102 (Release 6) "Characteristics of the USIM application", ETSI TS 102.241 (Release 6) "UICC API for Java Card". The Mobile Network can also be any future mobile, fixed line, or any other combination of network. The application module 2090 can further support the following phonebook file types, for example: ADN, ANR, EMAIL, SNE, etc. The module 2090 can also support basic phonebook structure: PBR type 'A8' ('A9' or 'AA' type extended phonebooks are optional). The application module 2090 can communicate directly via GPRS, SMS, MMS, or TCP/IP. The UICC Card Requirements are, for example, Java Card 2.1.1/2.2.1. Basic functionality requires approximately 18K storage on the UICC card. Other card requirements and storage capacity are possible and envisioned. Further, although functionality is discussed with respect to the first user phone 2010, similar functionality is available and installed on the second user phone 2050.

Figure 3:
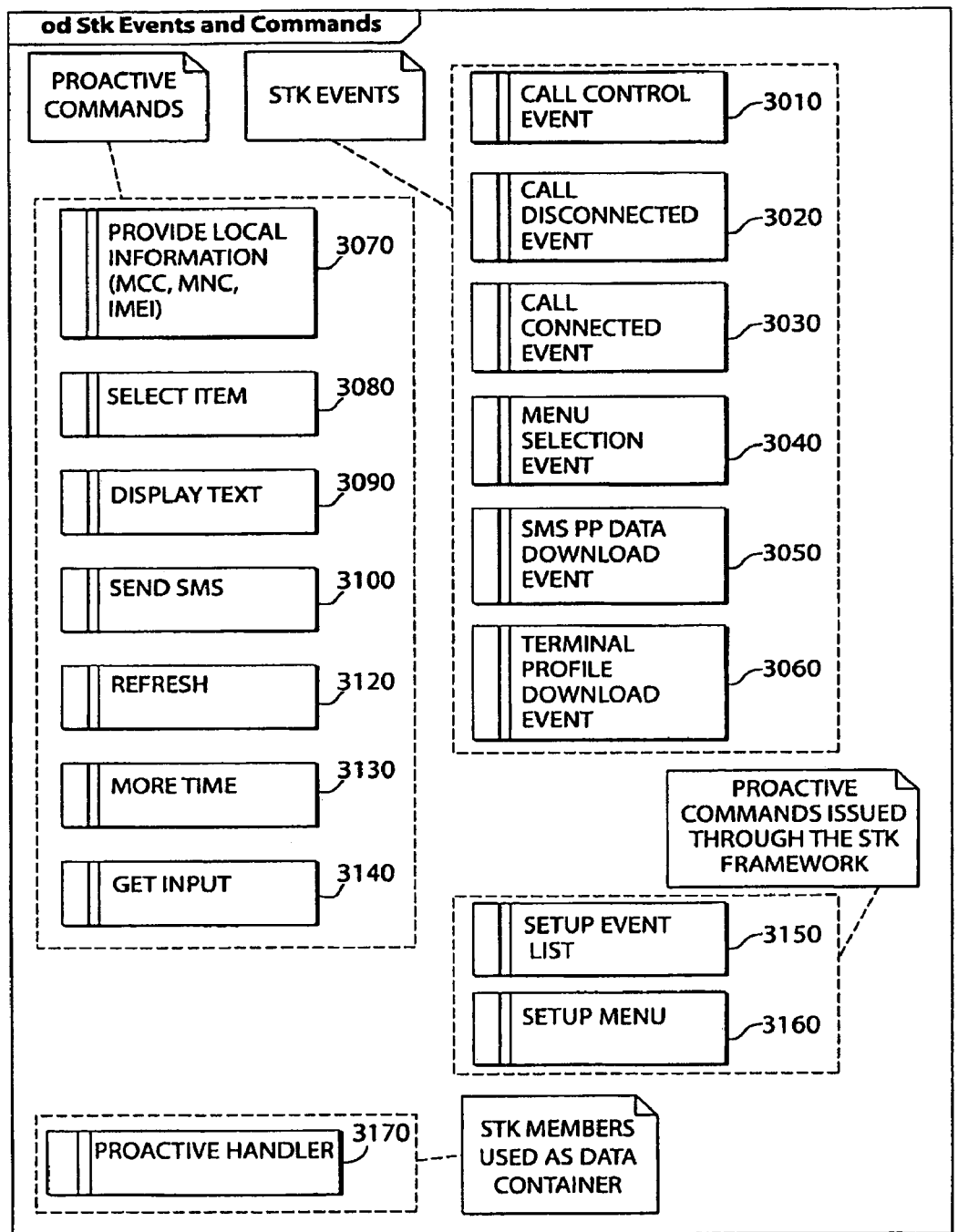
FIG. 3 is a data flow chart of a communication system according to one embodiment of the invention.

Referring also to FIG. 3, the application module 2090 is built on the SIM Tool Kit (STK) Framework 2032, which communicates to the first user phone 2010 through the Event Communication Module 2014. The STK framework 2032 registers with the following events of the first user phone 2010: a call control event 3010, a call disconnected event 3020, a call connected event 3030, a menu selection event 3040, an SMS PP data download event 3050, and a terminal profile download event 3060. The SIM Tool Kit (STK) framework 2032 sends proactive commands to the first user phone 2010. For example, the framework 2032 sends a command for providing local information 3070, select items 3080, display texts 3090, send SMS 3100, refresh 3110, more time 3120, and get input 3130. A setup event list 3150 and a setup menu 3160 are proactive commands issued through the STK Framework 2032. A proactive handler 3170 is used as a data container, e.g., for storage of data.

Figure 4:
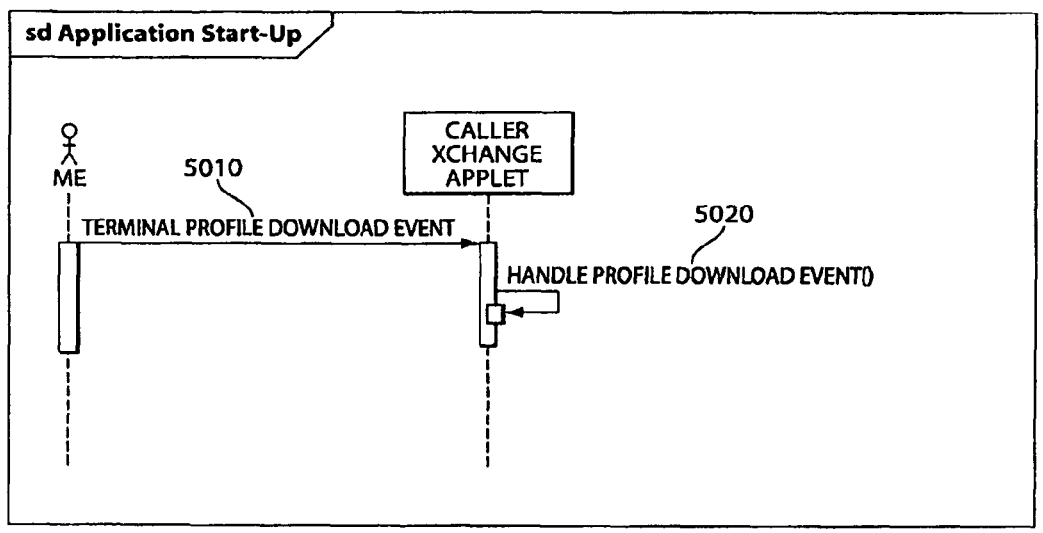
FIG. 4 is a data flow chart of a communication system according to one embodiment of the invention.

Referring also to FIG. 4, a method of initiating the (U)SIM application module 2090 over the mobile phone 2010 and the UICC card 2030, is now described. The (U)SIM application module 2090 can be inserted into the User 1 UICC card 2030 by the mobile operator or by the UICC manufacturer, for example. The UICC cards may be purchased with the (U)SIM application module 2090 preinstalled to the UICC card 2030 by the UICC card manufacturer, to the RAM of the card. The first user inserts the UICC card 2030 in the mobile phone 2010 and the (U)SIM application module 2090 is powered automatically to determine if the application module 2090 is set to a "Disable" state, stage 5010. If the applet is not set to "Disable", then the application module 2090 configures itself based on the Terminal Profile Download Event 3060, at stage 5020 (see FIG. 5B and related description).

Figure 5A:
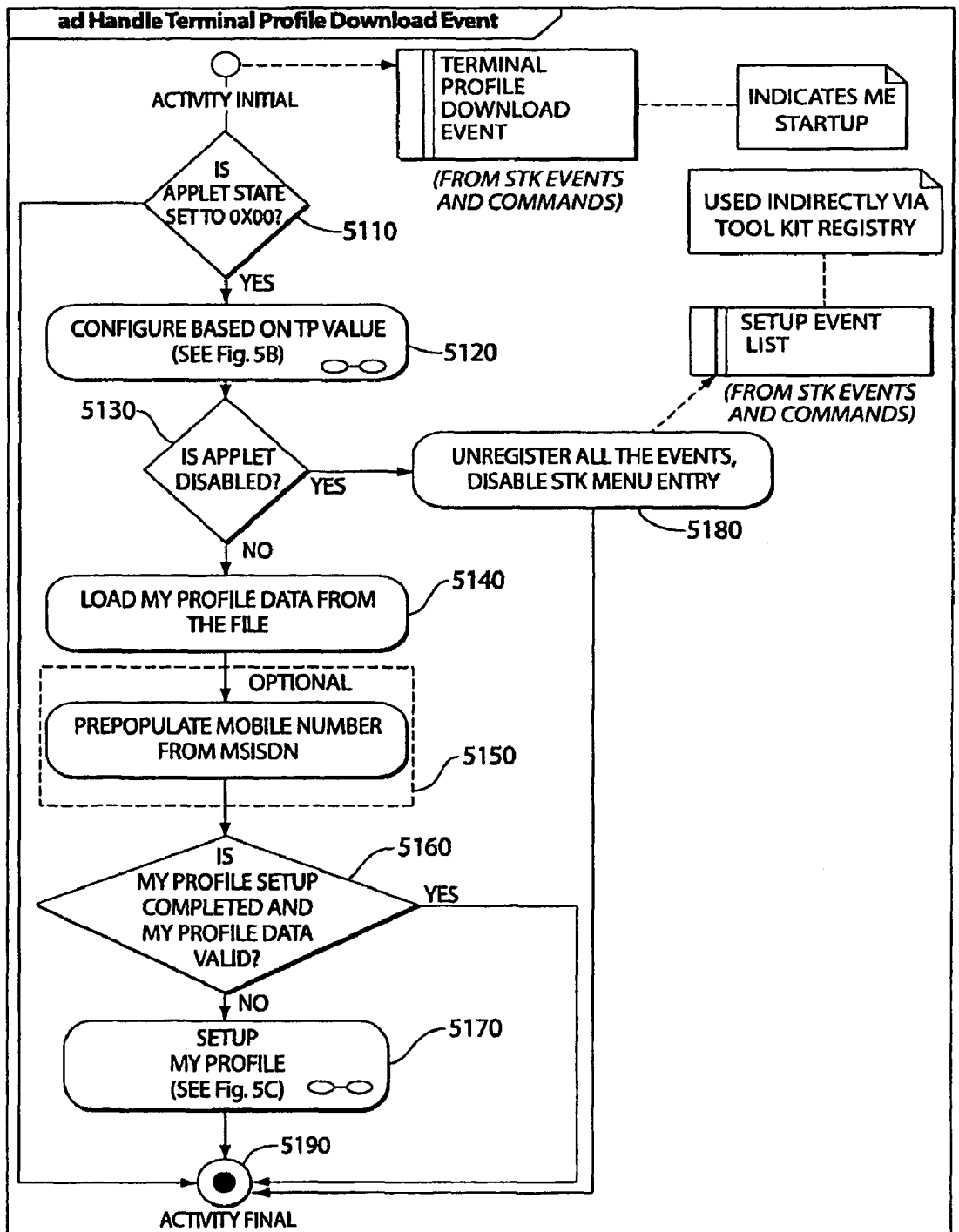
FIGS. 5A-5D are data flow charts of subsystems of a communication system according to one embodiment of the invention.

Referring also to FIG. 5A, the application module 2090 handles the Terminal Profile Download Event 5010. The terminal profile download event 5010 lists the events the phone supports. If some of the SIM Toolkit events/commands are not supported by the handset, the (U)SIM application module 2090 operates differently in order to compensate for the phone's short-comings, at stage 5130. When the minimum handset requirements are not met, the (U)SIM application module 2090 deactivates and removes itself from the SIM Toolkit menu, stage 5180. At stage 5140, if the application module 2090 is in operational mode, the application downloads the MyProfile Data File 2035. At stage 5160, prior to the operation of the (U)SIM application module 2090, the first user initiates setup of the application to enable sending and receiving contact information with others, stage 5160. The (U)SIM application module 2090 requests that User 1 activates the application through a setup process, stage 5170 (see FIG. 5C and accompanying description for the setup process). At the conclusion of, or upon interruption of or at the temporary break from the setup Profile Process, stage 5170, the activity ends, stage 5190.

Figure 5B:
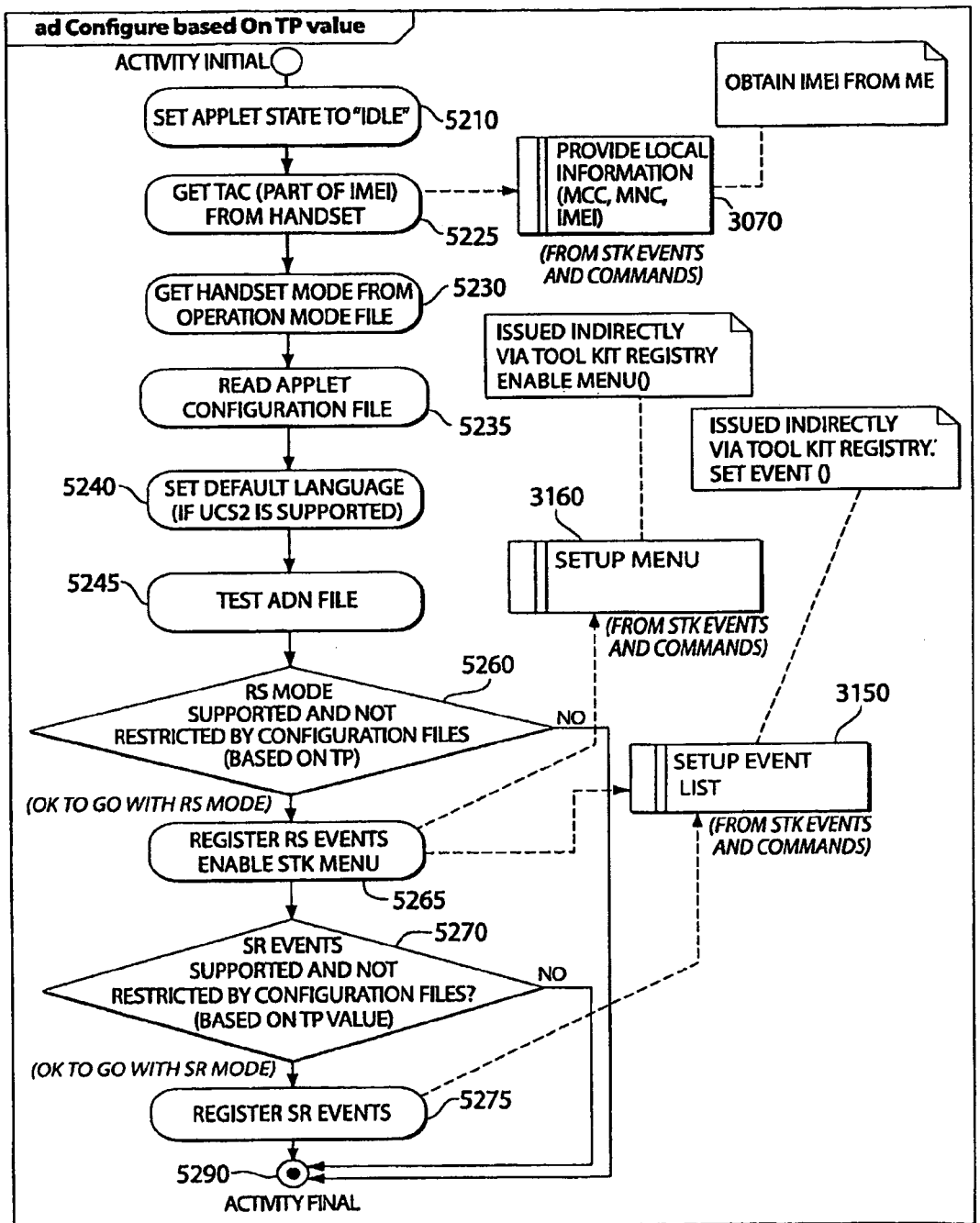

Referring also to FIG. 5B, the application module 2090 is configured according to the capabilities of the phone 2010, 2050. At stage 5210, the application module 2090 sets to an "Idle" status. At stage 5225, the application module 2090 collects the TAC (Part of IMEI number) from the phone 2010. At stage 5230, the application module 2090 gathers a handset mode from the Operation Mode File 2034. At stage 5235, the application module 2090 reads the User 1 Configuration File 2039. At stage 5240, the default language is set if UCS2 is supported within the UICC card 2030. At stage 5245, the Abbreviated Dialing Number (ADN) File (SIM phonebook 2033) is tested. At stages 5260, 5265, 5270, the (U)SIM application module 2090 registers the operation level of the application. The application module 2090 can operate in two different modes: SR (Send and Receive) or RS (Receive Then Send). The embodiments of this invention describe the fully featured SR Mode. RS Mode is a subset of the fully functional SR Mode. The applet reaches stage 5290, and the application configuration is completed based on the terminal profile of the phone 2010.

Figure 5C:
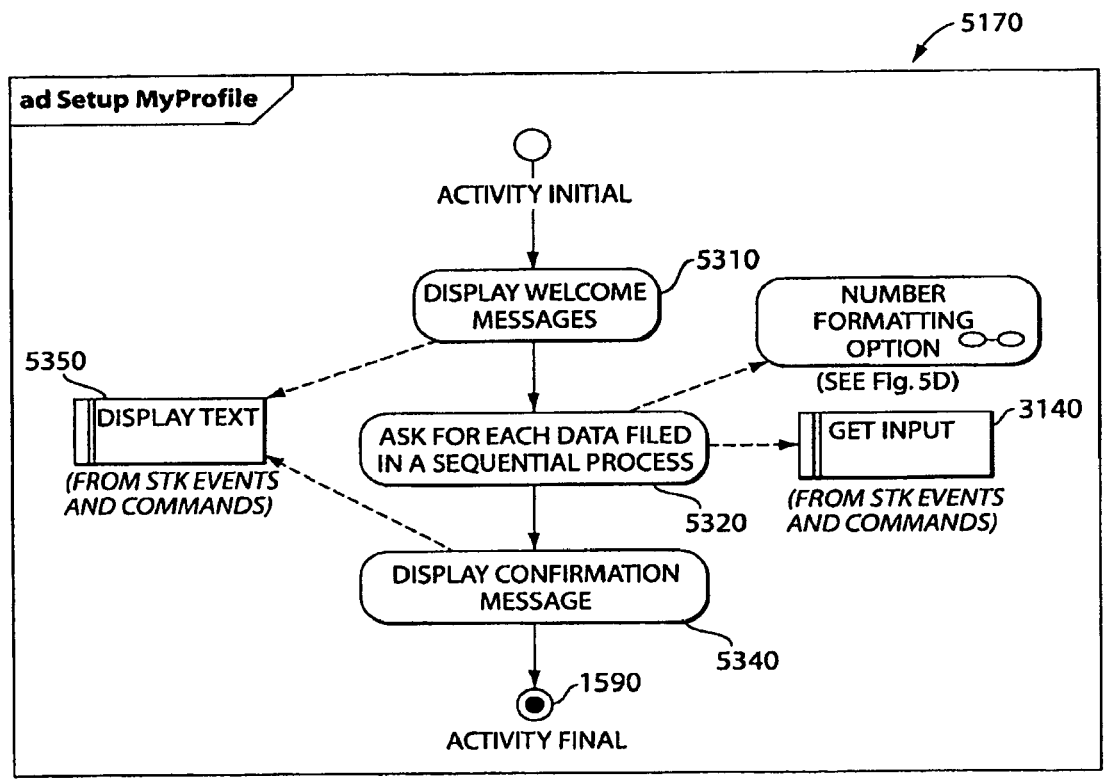

Referring also to FIG. 5C, a user sets up the MyProfile File 2035 on the UICC card 2030. Activation can also be done at the point of sale or OTA network 2001 remotely by the mobile operator through a remote configuration process. If the (U)SIM application module 2090 is pre-installed, turning on the phone or ending a call after the first incoming or outgoing call may also activate the (U)SIM application module 2090.

In FIG. 5C, the applet activation process through a manual operation by a user is described. When the (U)SIM application module 2090 executes, User 1 is prompted to initiate the applet at stage 5310 by entering the contact information with the following dialog box, for example: "Set up your profile once, and exchange it with friends after phone call" using the STK Display Text Proactive Command 3090. At stage 5320, User 1 is asked to enter each contact data in a sequential manner. The standard fields of contact information include fields for a mobile phone number, office phone number, and a home phone number. Other fields of data such as email and Instant Messenger address may be entered after the initial set up process. User 1 is asked to enter a name for the contact, and a mobile number for the contact. User 1 is also asked to enter a work number and a home number. The numbers are formatted, and User 1 is redirected to stage 5320 for a next entry. The contact data is stored by the STK using a Get Input Proactive Command 3140 within the user 1 MyProfile 2035.

Figure 5D:
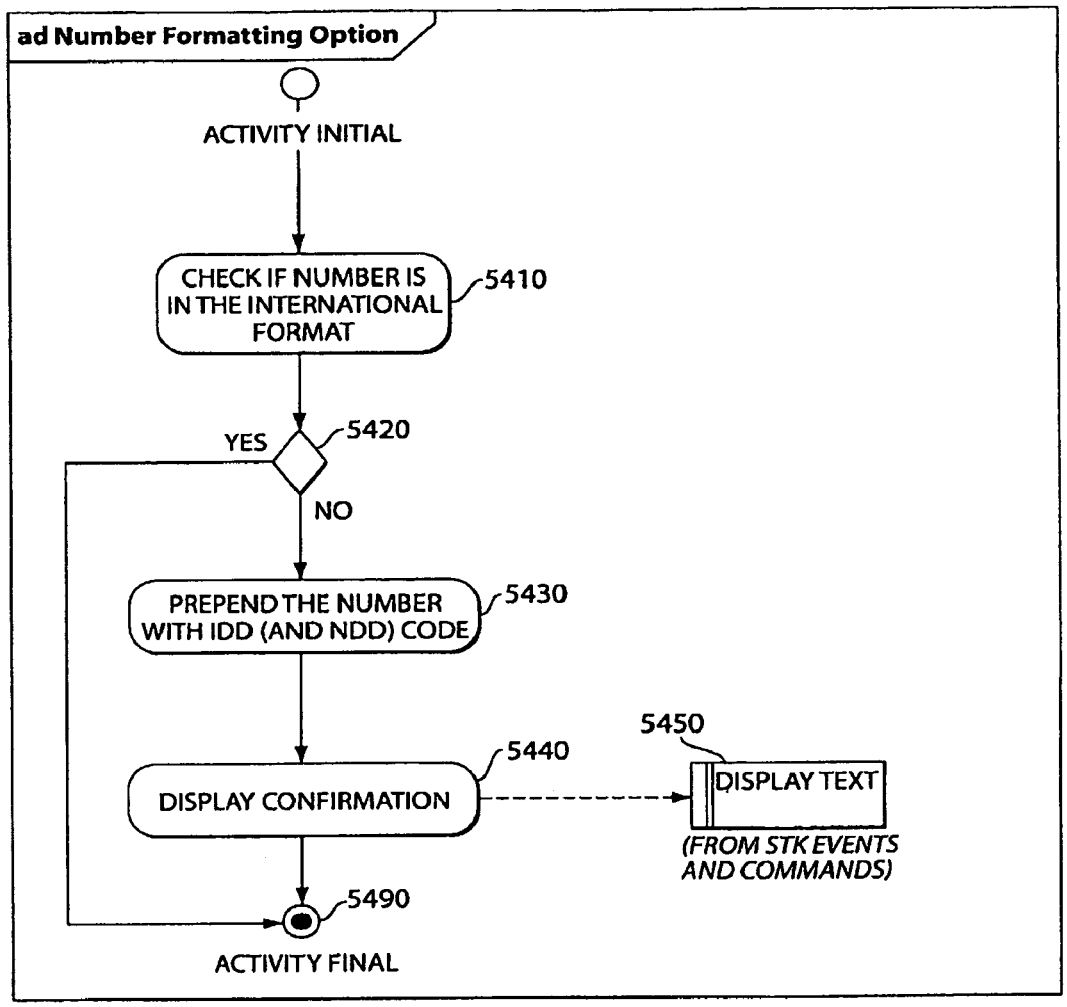

Referring also to FIG. 5D, the User 1 application module 2090 checks if the entered contact phone numbers are in the correct International Format. Each time User 1 is asked to enter a phone number (Mobile, Work and Home), the (U)SIM application module 2090 automatically validates whether the entered numbers matches international numbering format (such as +15088368810), stage 5410. If the formatting is correct, the process terminates at stage 5490. If the formatting is incorrect, the application module 2090 appends the International Direct Dialing (IDD) and the National Direct Dialing (NDD) code to the numbers. The confirmation is displayed to the user using the Display Text Proactive Command 3090. Once the confirmation is displayed, the process is terminated, at stage 5490. The numbers input by the user are checked to fit to International formats and stored within the User 1 MyProfile Data File 2035.

Although the processes of FIGS. 2, 3, 4 and 5A-5D are described according to use by User 1, the User 2 UICC card 2091 executes the same, or substantially similar, processes for the configuration of the phone 2050. The User 2 contact information is stored in the second user MyProfile Data File 2085, and the applet configuration is stored in the second application module Configuration file 2089.

For demonstration purposes, the standard fields of contact information are Name, Office Phone, and Home Phone. Other fields of data may be entered after the initial set up process, such as "Email" or "Instant Messenger". The contact data fields can be limited to the standard fields, but may include other fields. The users have the option of changing these designations at any time by accessing the application module 2090 through the SIM Tool Kit 2032 and 2082 menu within the UICC card. The application module updates the MyProfile Data File 2035 for User 1 and MyProfile Data File 2085 for User 2 (see FIG. 8 and accompanying description, Manual Applet Navigation).

Figure 6A:
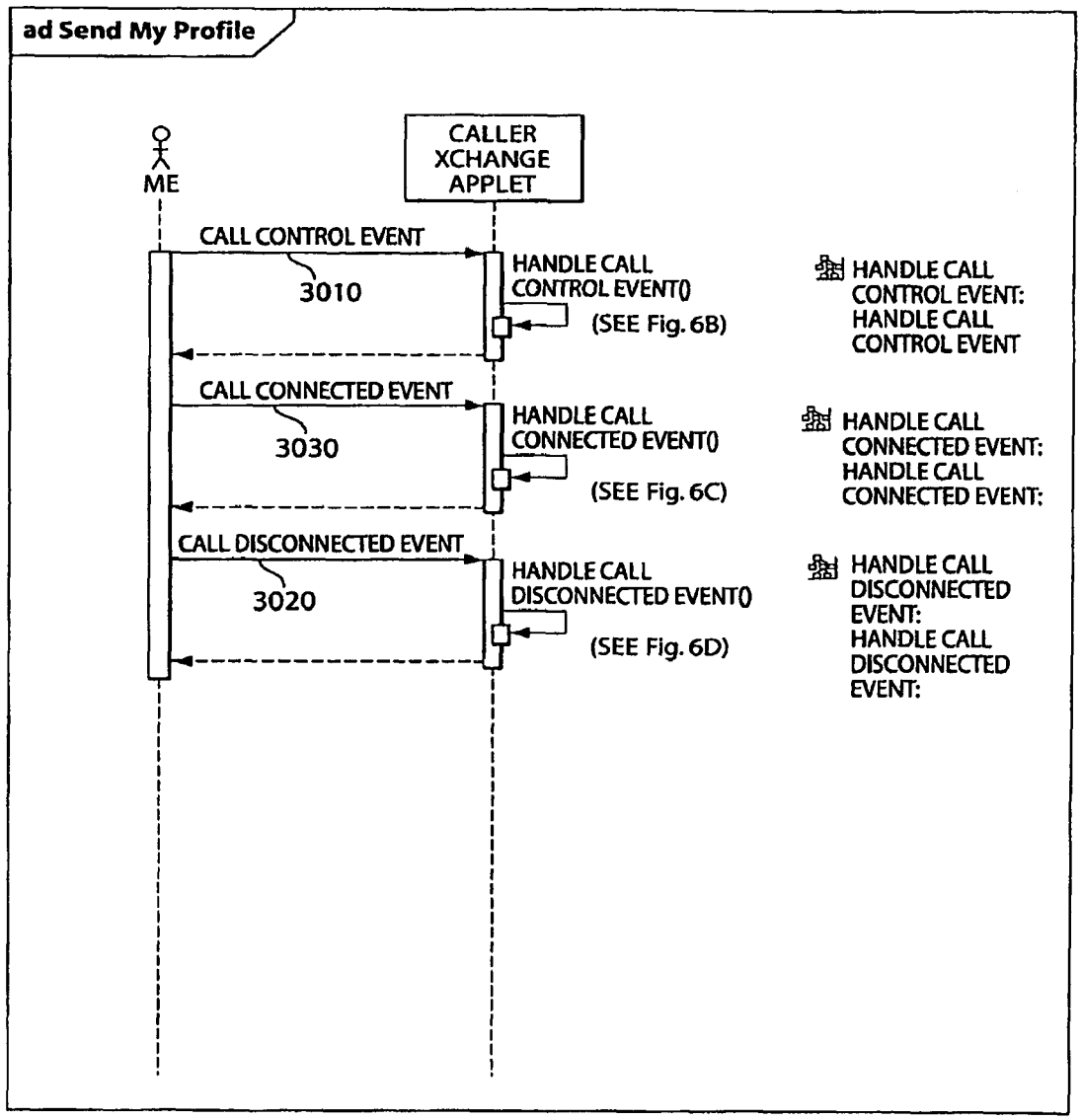
FIGS. 6A-6I are data flow charts of subsystems of a communication system according to one embodiment of the invention.

Referring also to FIG. 6A, the User 1 application module 2090 communicates, packages the information, and sends the User 1 contact information to User 2. The contact information management system 2000 can be used over a mobile network. User 1 places a call with the User 1 phone 2010 to the User 2 phone 2050 via the mobile operator. The (U)SIM application module 2090 of the User 1 UICC card 2030 is initiated when the "Call Control Event" is triggered within the phone 2010.

Figure 6B:
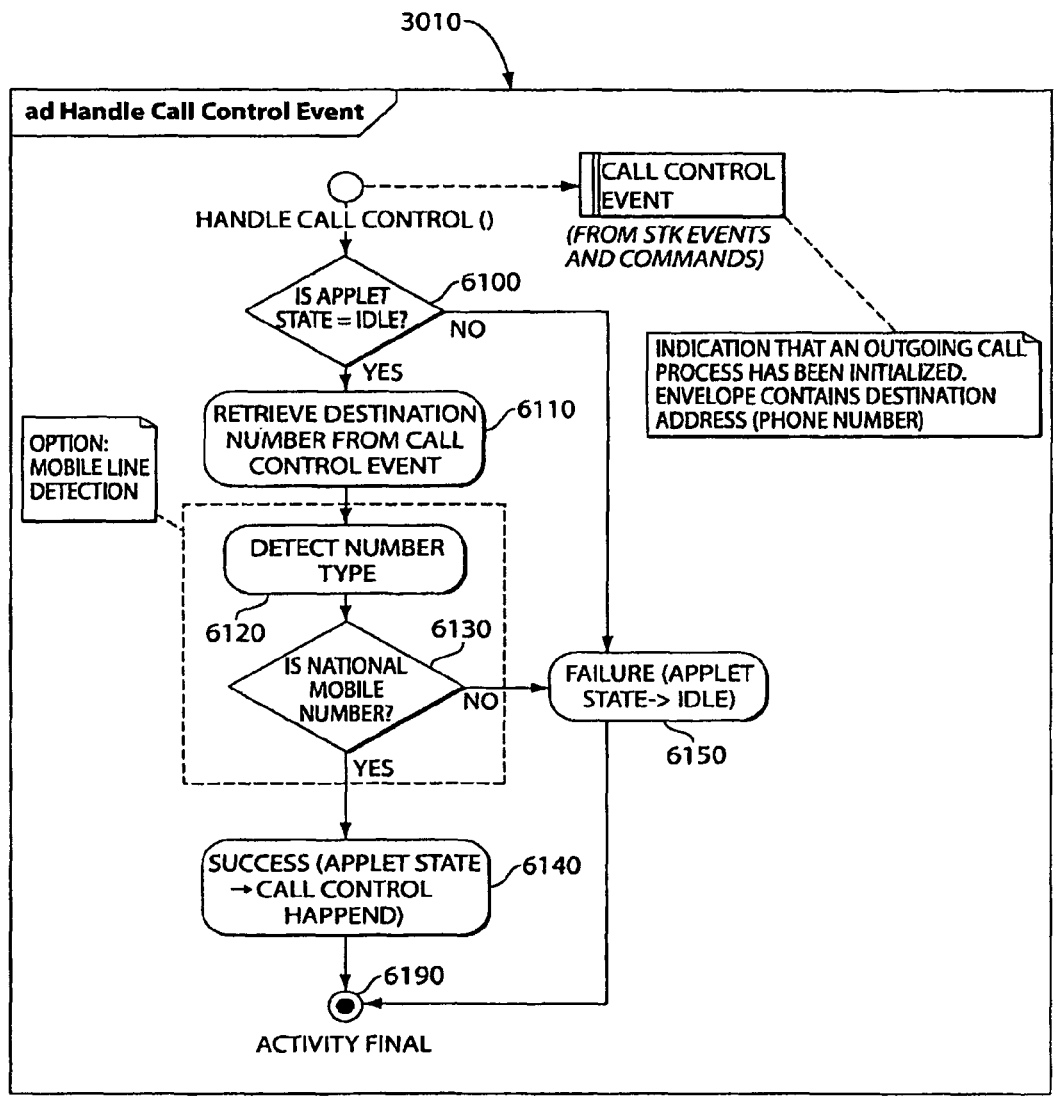

Referring also to FIG. 6B, the User 1 application module 2090 checks the User 2 operations mode data file 2084 to see if the application module 2090 is in "active" mode, stage 6100. If the applet module 2090 is in the "Idle" state, the module does not do anything and remains in the "Idle" state. If the applet is in the "Active" state, the module 2090 retrieves the phone number of the User 2 phone 2050 from the Call Control Event 3010. The U(SIM) application module 2090 detects the number type, stage 6120. If the number is a listed national mobile number, then it sets the applet state as a "Call Control Happened", stage 6140. If the dialed number is a "non-mobile" number, then the application module 2090 sets its state as "Idle", stage 6150. After successfully retrieving the User 2 Phone Number, the applet completes this process, at stage 6190. As shown in FIG. 6, the call connected event 3030 triggers the application module 2090.

Figure 6C:
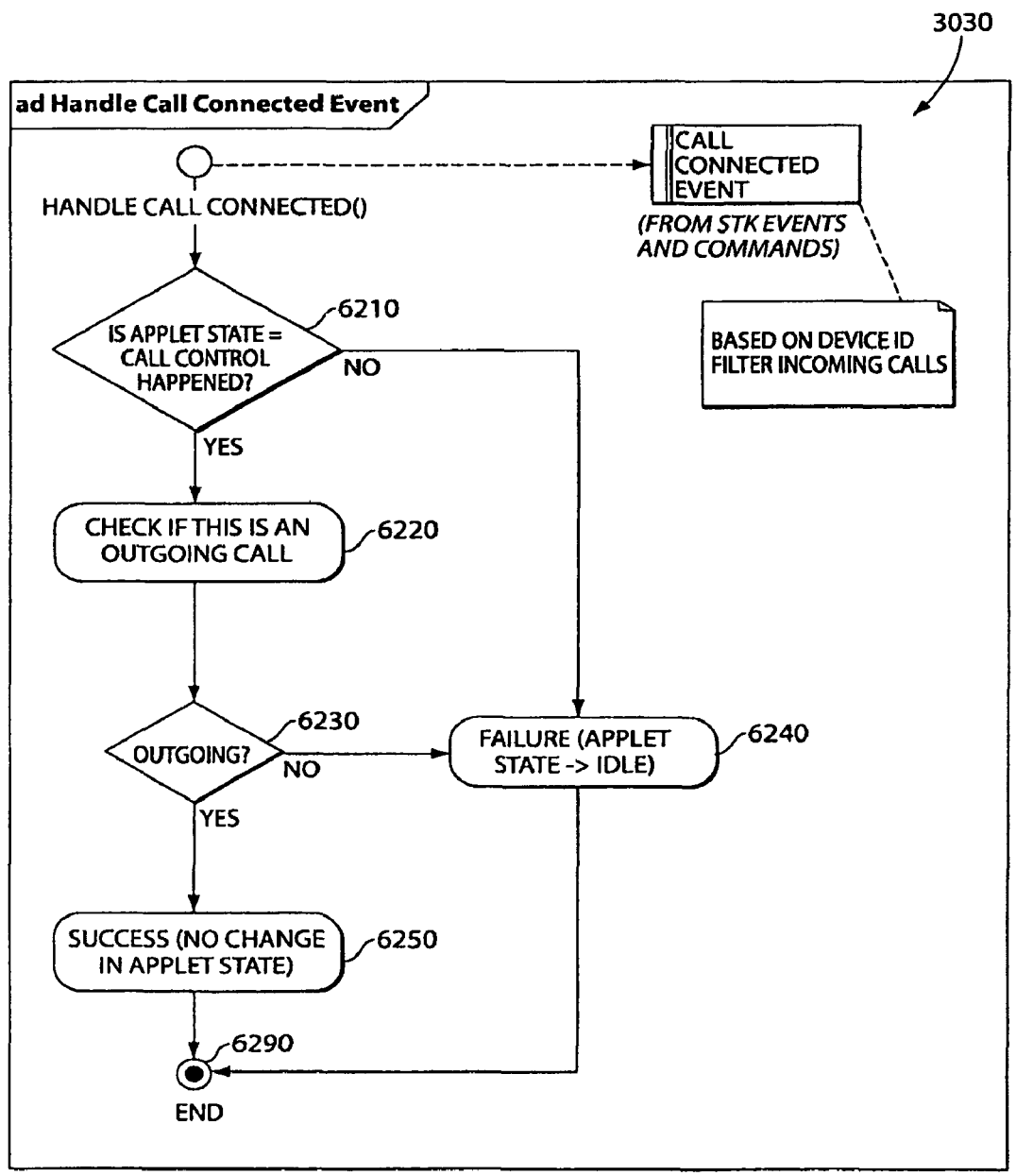
Figure 6D:
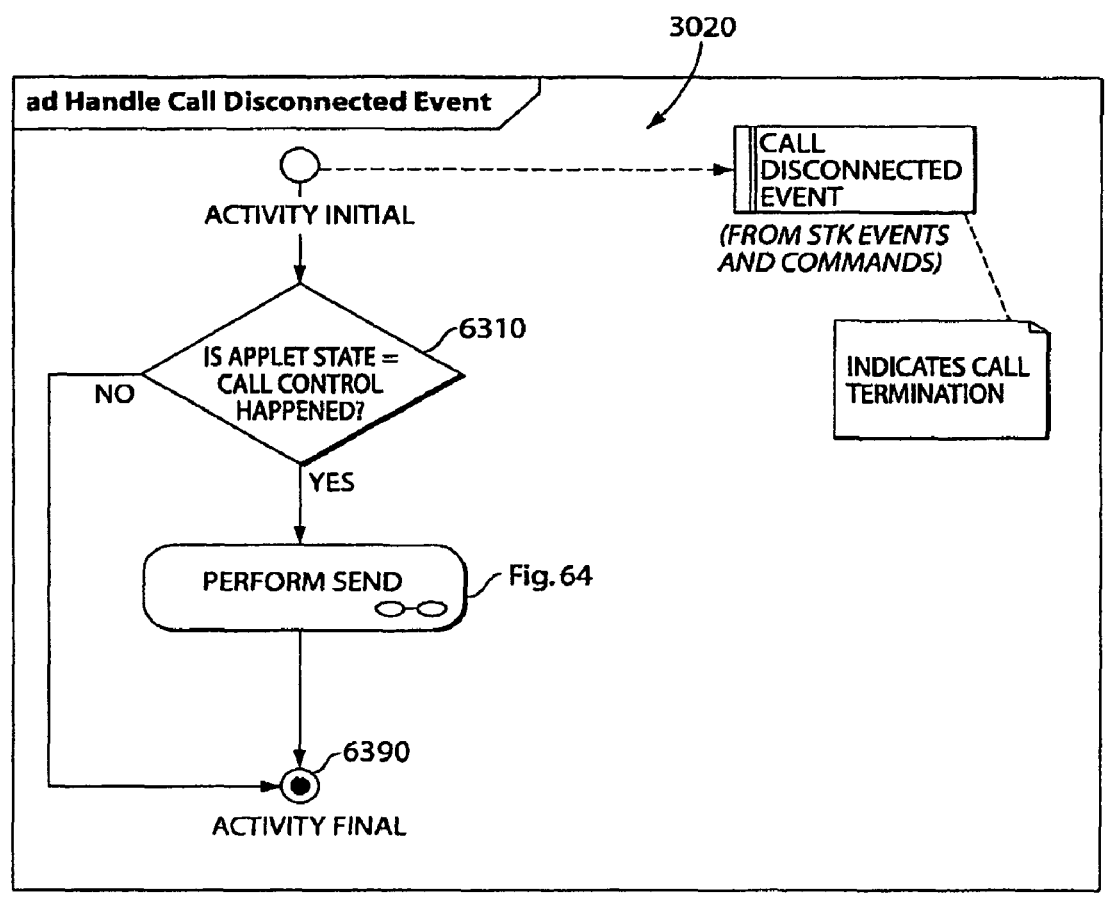

Referring to FIG. 6C, after the Call Connected Event 3030 is triggered, the application module 2090 checks at stage 6210 if the applet state is in "Call Controlled Happened" state. If the applet state is different, then the applet terminates itself at stage 6290. If the applet is in the correct state, then the application module 2090 checks if this is an outgoing call, at stage 6220. If this is not an outgoing call, then the applet state fails and the applet terminates itself at stage 6290. If this is an outgoing call, then at stage 6230, the module 2090 remains in "Call Control Happened" state and continues its function.

When the User 1 hangs up the phone 2010, the call disconnected event 3020 triggers the User 1 application module 2090. As described in FIG. 6D, at stage 6410, the User 1 application module 2090 checks if the applet state is still in "Call Control Happened" state. If the application state is different, then it jumps to stage 6490 and makes no changes. If the application state is the same, the User 1 application module 2090 performs a "Send" function which is described in detail in FIG. 6E.

Figure 6E:
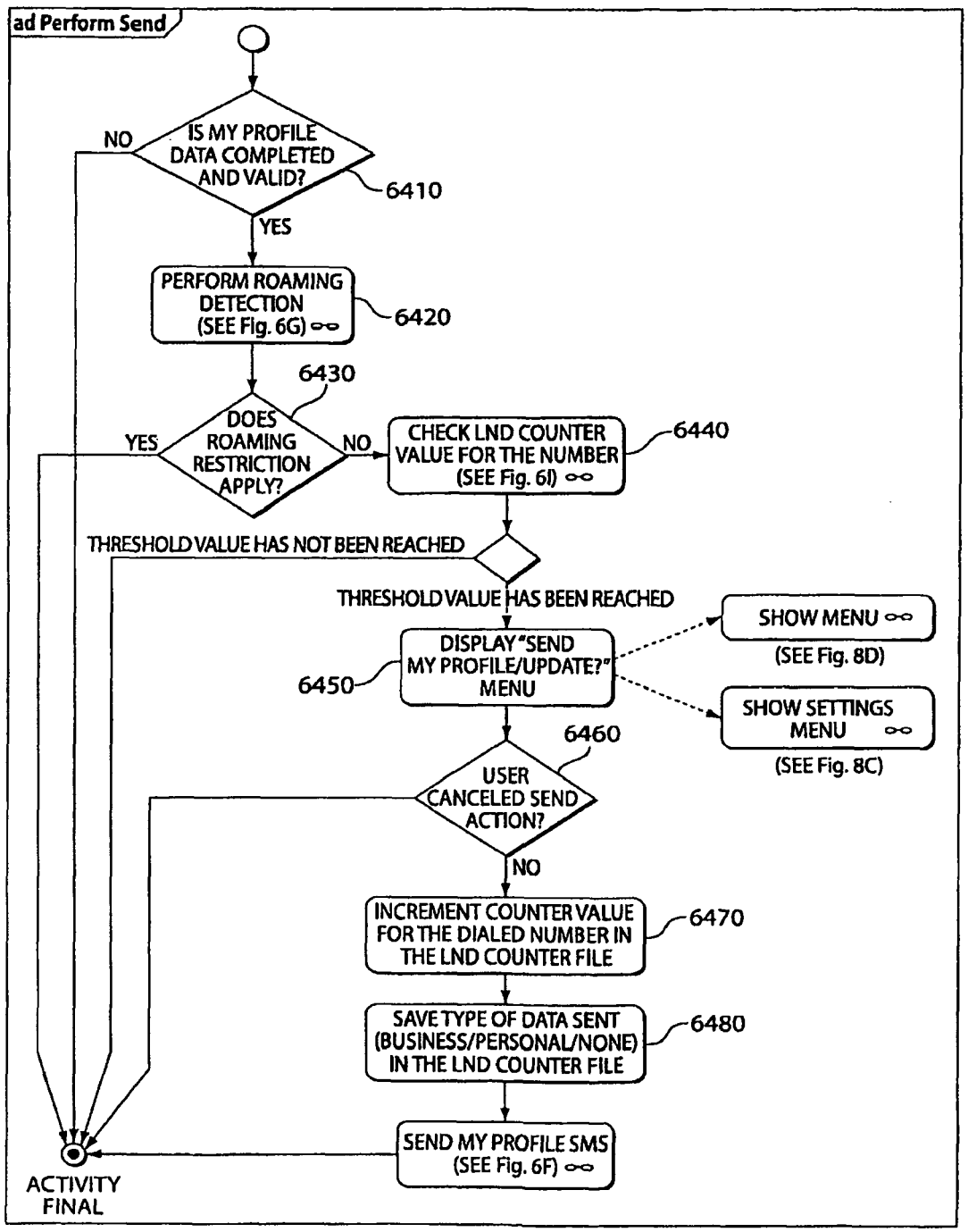

Referring also to FIG. 6E, the User 1 application module 2090 sends the User 1 contact information. At stage 6410, the User 1 application module 2090 checks if the User 1 MyProfile Data File 2035 is complete and valid. If it is not, the application goes to stage 6490. If the User 1 MyProfile Data File 2035 is complete and valid, the User 1 application module 2090 performs a Roaming Detection (see FIG. 6G and associated description). At stage 6430, if the roaming restriction applies, the application goes to stage 6490. If there are no roaming restrictions in place, at stage 6440, the User 1 application module 2090 accesses the User 1 LND Counter Data File 2037 and checks if the Last Number Dialed (LND) threshold value has been reached. At stage 6440, if the LND Counter threshold value has not been reached, the application goes to stage 6490. If the LND Counter threshold value has been reached, the User 1 application module 2090 triggers a question to Display Control Module 2017: "Send My Profile". The User 1 has four options: "Personal", "Business", "Both", "Do not Send" and "Settings". If User 1 selects the "Do not Send" option, the application module 2090 does not prompt any other questions. If User 1 selects "Settings", the User 1 is directed to the Settings screen to make modifications to MyProfile or to Disable/Enable the Send and Add Features. If the User 1 selects one of the other options ("Personal", "Business", "Both"), then at stage 6460, the User 1 application module 2090 increments the LND counter value for the dialed phone number and, at stage 6470, saves the new value within the User 1 LND Counter Data File 2037. The User 1 application module 2090 creates a "Send MyProfile" SMS (see FIG. 6F and associated description). In order to let User 1 be aware that application module 2090 exchanges contact information using SMS, the first time User 1 chooses to send his contact information, User 1 is notified by the following message: "You are going to send SMS, are you sure you want to continue?" This notification is made once, and if User 1 either accepts or rejects sending SMS the first time this notification is made, this message will not be displayed for subsequent Sends. At stage 6490, the User 1 application module 2090 goes back to its original listening state.

Figure 6F:
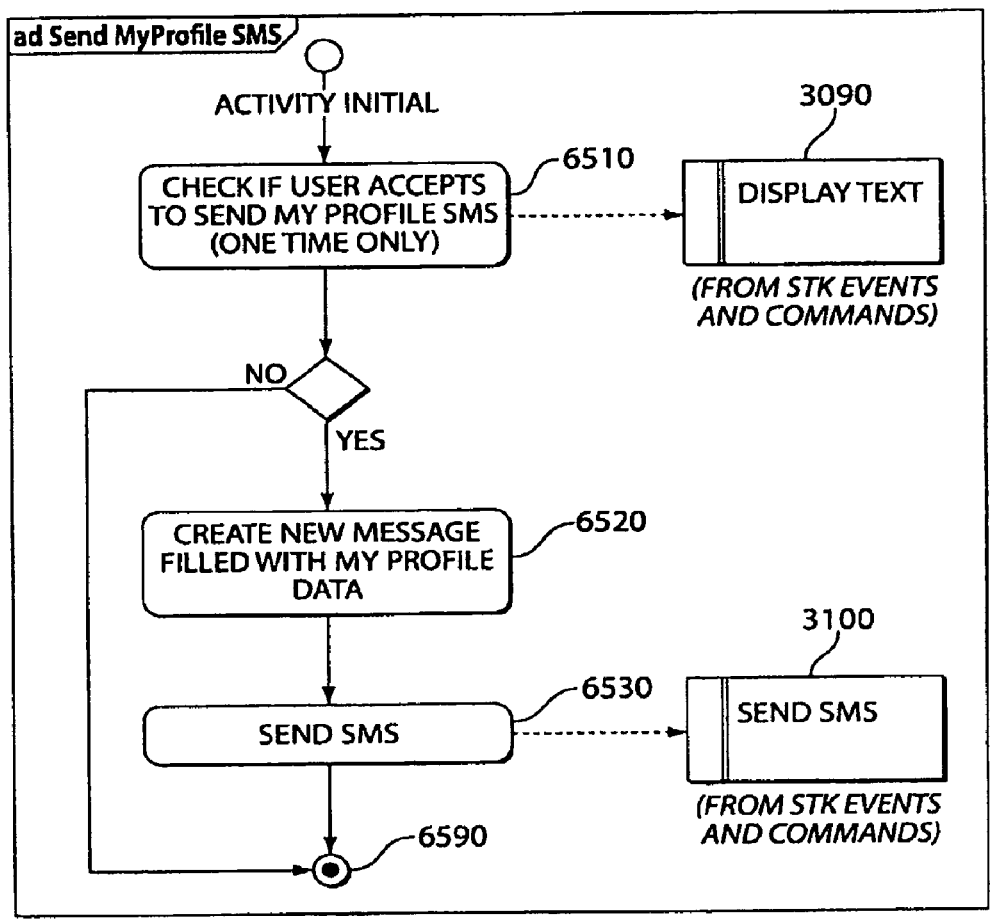

Referring to FIG. 6F, the User 1 application module 2090 sends the User 1 contact information in a SMS. At stage 6510, if User 1 selects the "Personal" option, a confirmation message is displayed on the User 1 Display Module 2017 through Display Text Proactive Command 3090: "Sending MyProfile SMS . . . " and in Step 6530 an SMS message is sent that contains First Name, Last Name, Mobile and Home data fields specified in MyProfile. If User 1 selects the "Business" option, then a confirmation message is displayed: "Sending MyProfile SMS . . . " and the SMS message is sent and contains First Name, Last Name, Mobile, Work data fields specified in MyProfile. If User 1 selects the "Both" option, then a confirmation message is displayed: "Sending MyProfile SMS . . . " and the SMS message is sent and contains First Name, Last Name, Mobile, Home, Work data fields specified in the MyProfile Data File 2035.

Figure 6G:
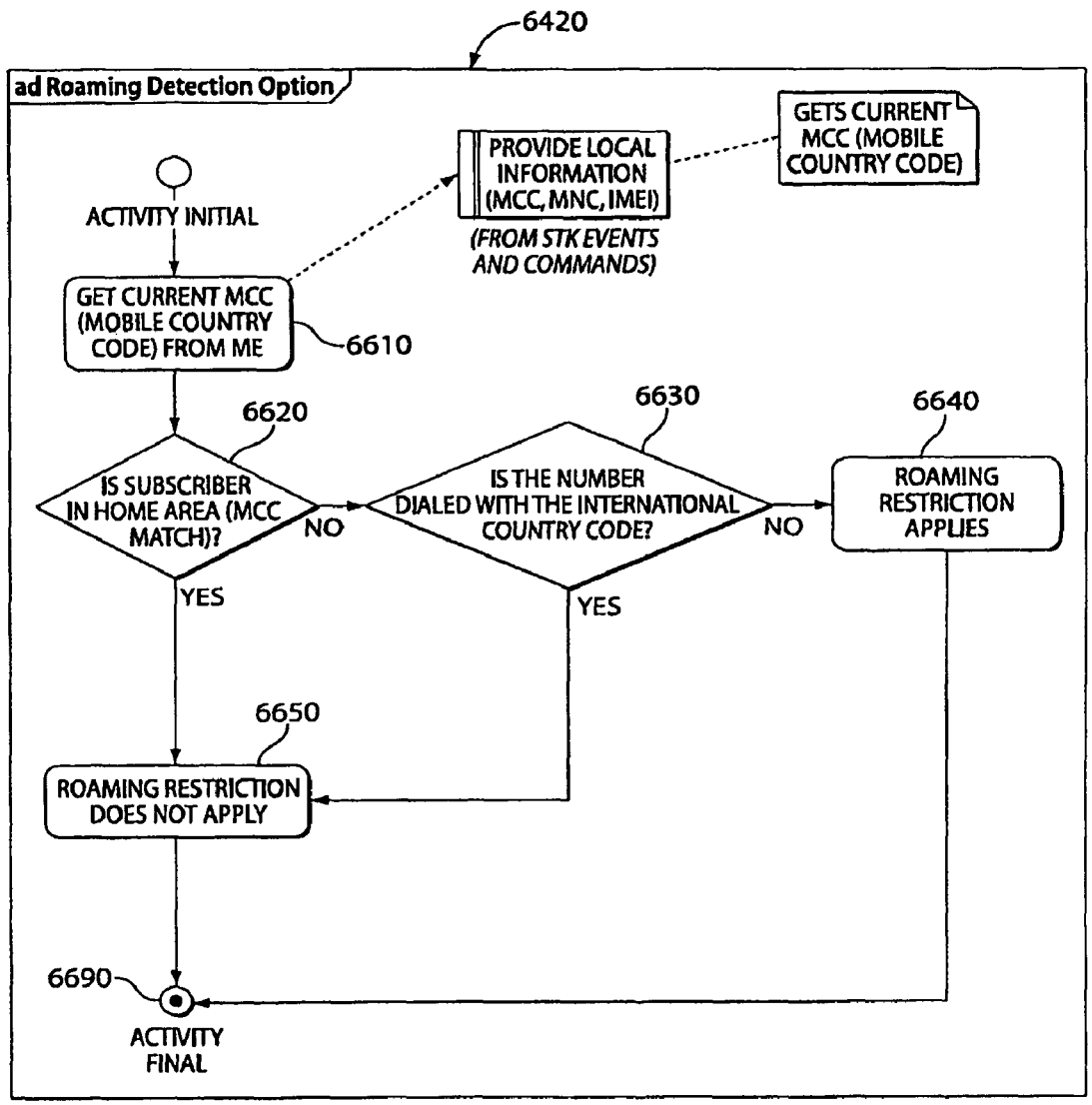

Referring also to FIG. 6G, the roaming detection option 6420 is described. When the User 1 application module 2090 activates the roaming detection at stages 6410 and 6610, the User 1 application module 2090 gets a Mobile Country Code (MMC) at stage 6610 from the phone 2010 using the Provide Local Information Proactive Command 3070 from STK. At stage 6620, if the current Mobile Country Code (MMC) matches the User 1's Mobile Country Code, the roaming restriction does not apply. At stage 6620, if the current Mobile Country Code (MMC) does not match User 1's Mobile Country Code, then, at stage 6630, the User 1 application module 2090 checks the number dialed with the International Country Code. If the number was dialed with the international country code, the roaming restriction does not apply. If the International Country Code is not dialed, at stage 6630, then roaming restrictions apply, and the application goes to stage 6440 in FIG. 6E.

Figure 6H:
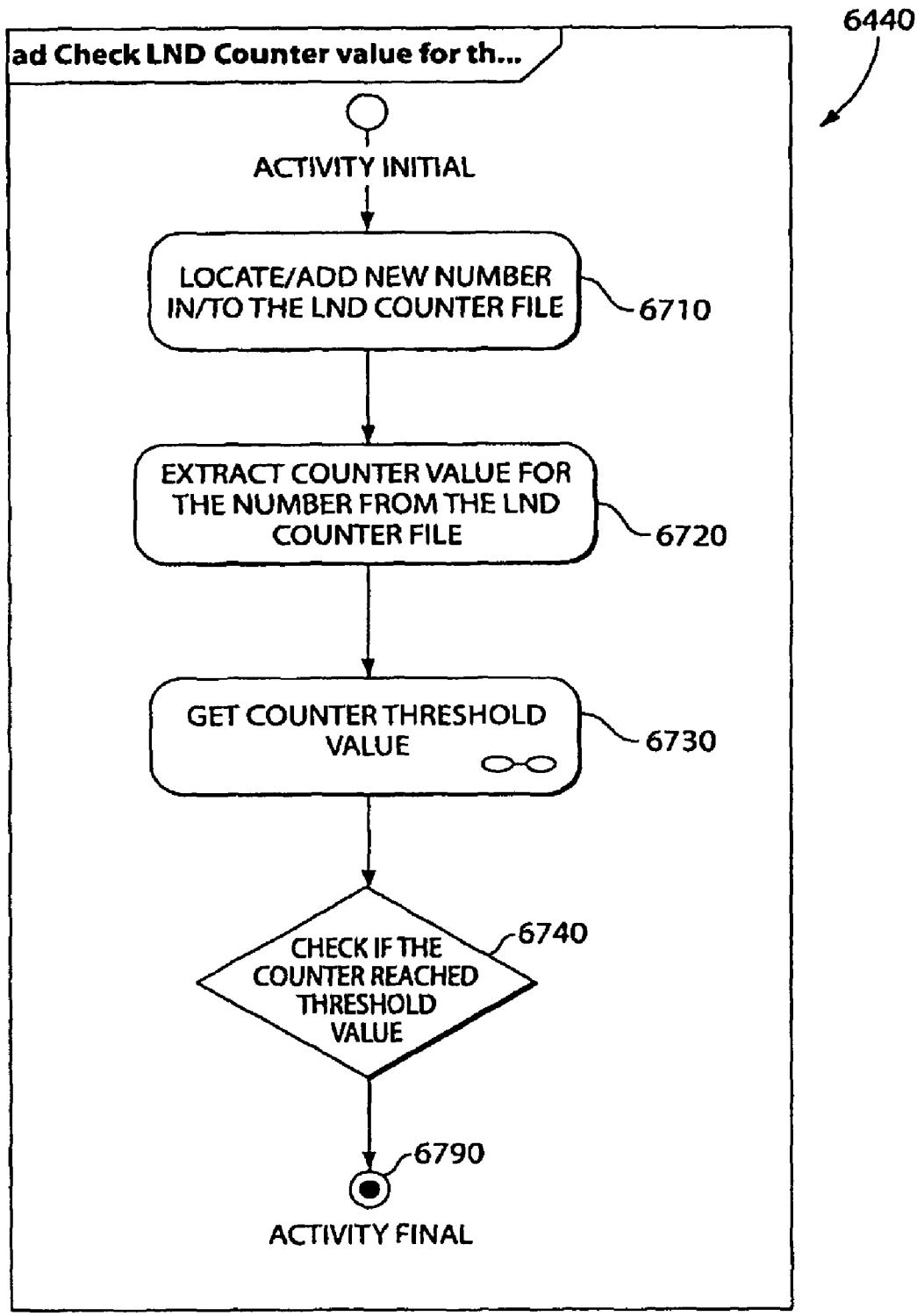

Referring also to FIG. 6H, the User 1 application module 2090 checks the LND counter value for each user. The LND counter value check feature is an enhancement to the static Event Counter. The number of times User 1 is prompted to send an update to other users is reduced. The value check process 6440 is based on the frequency in which each number is called (i.e. some numbers are called 10 times a day, and others are called 10 times in a month) so that User 1 is asked to resend his contact information after an appropriate number of calls—instead of a fixed number of calls. At stage 6710, the User 1 application module 2090 locates the new dialed number from the LND Counter Data File 2037. If the dialed number is not in the list, the number is added to the list. At stage 6720, the User 1 application module 2090 extracts the counter value for the number from the User 1 LND Counter File 2037. At stage 6730, the User 1 application module 2090 gets the Counter Threshold Value from the User 1 Configuration Data File 2039.

Figure 6I:
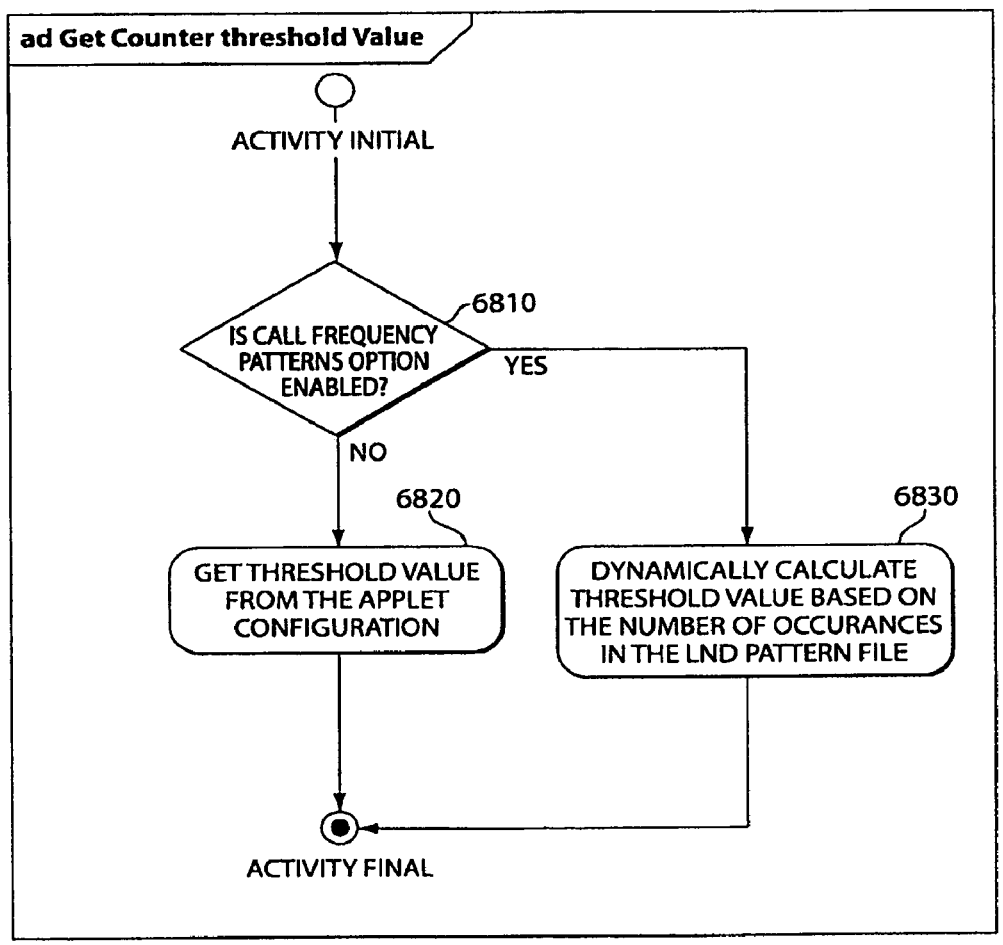

Referring also to FIG. 6I, the User 1 application module 2090 obtains a Counter Threshold Value. The "last numbers dialed" list is stored in the User 1 LND Pattern Data file 2038. The threshold value for send update question is based on the number of times a given number is represented in the "last number dialed" list. At stage 6810, the User 1 application module 2090 checks if Call Frequency Patterns Option is enabled by accessing the User 1 Configuration Data File 2039. If the call Frequency Patterns Option is not enabled, the module 2090 obtains the Standard Threshold Value from the User 1 Configuration Data File 2039. If the call Frequency Patterns Option is not enabled, the User 1 application module 2090 dynamically calculates the threshold value based on the number of occurrences in the User 1 LND pattern Data File 2038.

Figure 7A:
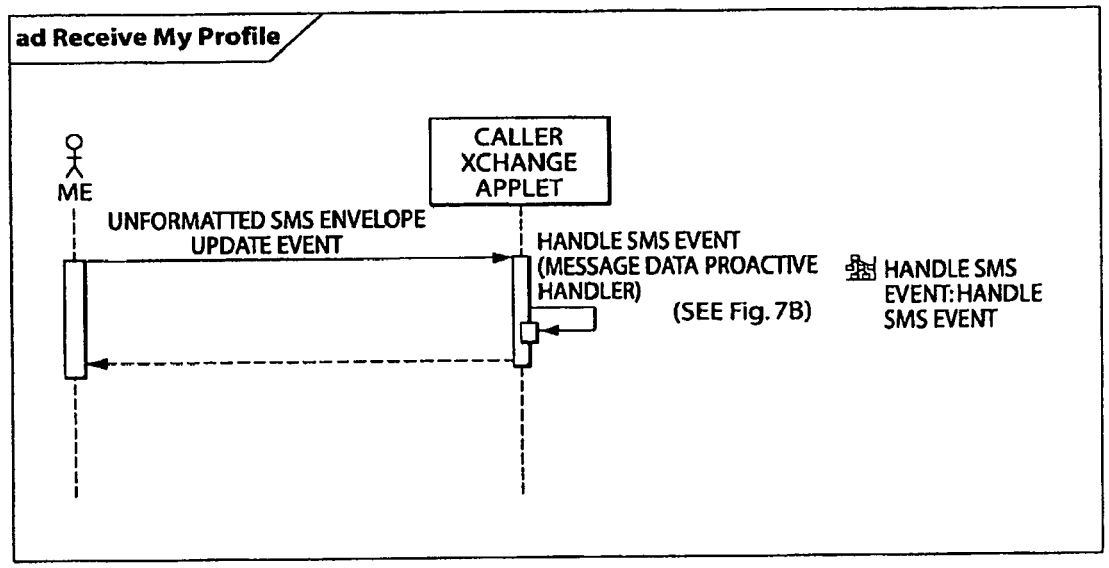
FIGS. 7A-7B are data flow charts of subsystems of a communication system according to one embodiment of the invention

Referring to FIG. 7A, the User 2 application module 2091 communicates and receives the User 1 contact information and inserts the information into the User 2 SIM phonebook 2083. Contact exchange occurs between User 1 and User 2 via a network. The User 2 application module 2091 communicates, packages and sends User 2 contact information to User 1. At the completion of a call, User 1 chooses to send his contact information. User 2 complete activation of the User 2 application module 2091, preferably prior to User 1 sending User 1 contact information to User 2. In FIG. 2, the User 1

SMS message travels through the Mobile Operator Over The Air (OTA) Platform 2001 and the Mobile Operator SMS-C Center 2040. User 2 phone 2050 receives a SMS message that contains the User 1 contact information. The SMS PP Data Download Event 3050 triggers the User 2 application module 2091 and it indicates a SMS reception.

Figure 7B:
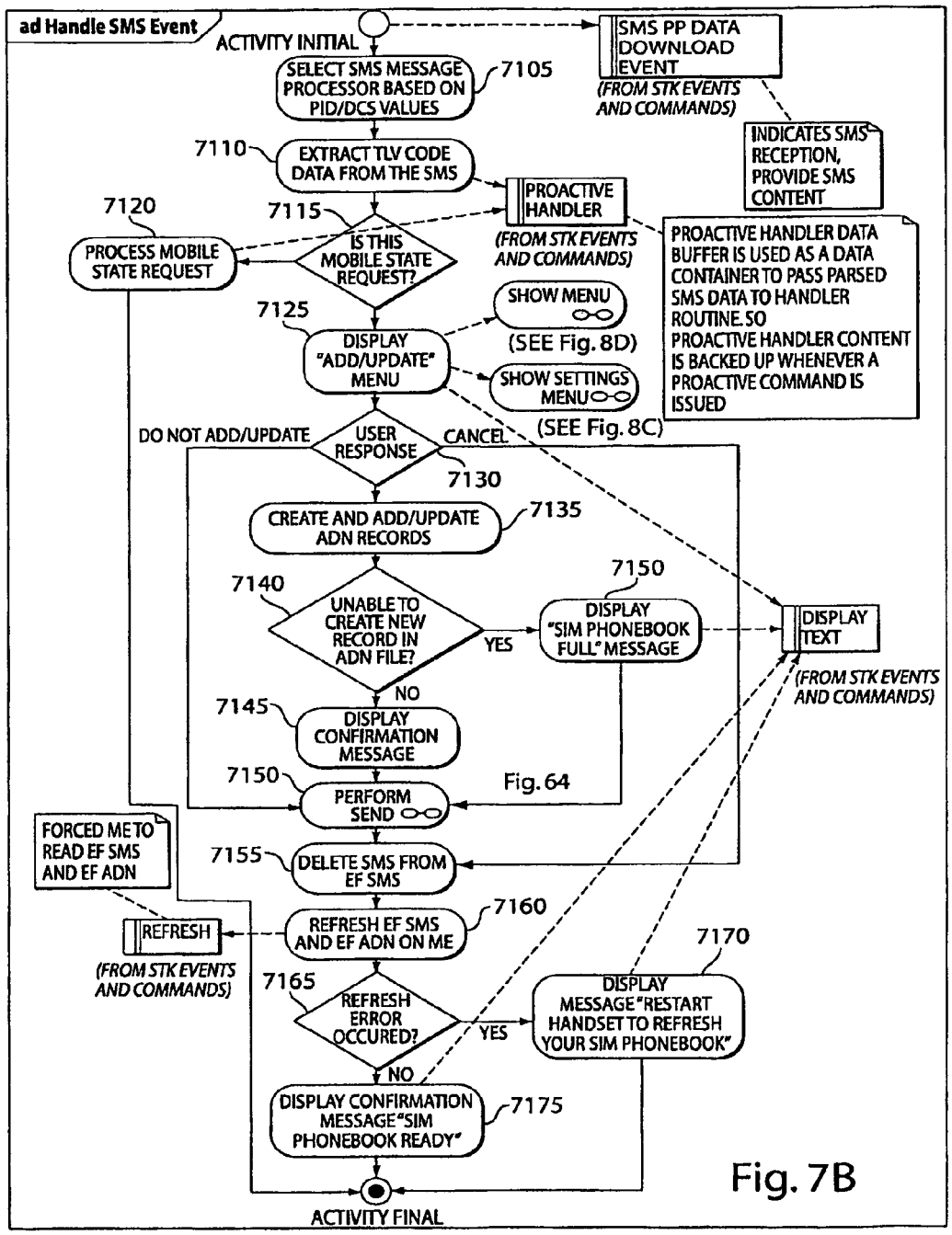

In FIG. 7B, the User 2 application module 2091 selects the SMS message processor based on PID/DCS values, stage 7105. At stage 7110, the User 2 application module 2091 extracts User 1 contact data from the SMS message. At stage 7115, the User 2 application module 2091 applies a check if the SMS message contains a Mobile Operator Report request. If it is a Mobile Operator Report request, the User 2 application module 2091 processes the Mobile Operator Report Request, stage 7120. If the SMS message is not a Mobile Operator Report request, the User 2 application module 2091 triggers the Application Menu in the User 2 Phone Display 2057 on the User 2 Phone 2050, stage 7125, through the Display Text Proactive Command 3090. (See FIGS. 8C and 8D and associated description, below). User 2 is prompted "SMS message received" (specific message dependent on handset). At stage 7125, the User 2 application module 2091 displays one of the two messages: "Add User 1?" (to SIM phonebook) or "Update User 1?" depending on whether User 1 is already stored in the User 2 (U)SIM Phonebook 2083. At stage 7135, If User 2 selects "Add" or "Update", then the User 1 contact entry is stored or updated in the User 2 (U)SIM phonebook 2083. If the new record is created or updates successfully, the User 2 application module 2090 displays a message "User 1 added to SIM phonebook" or "User 1 contact data updated".

If the User 2 application module 2091, at stage 7140, can not create the new entry within the User 2 (U)SIM phonebook 2083, the User 2 (U)SIM phonebook 2083 displays a "SIM Phonebook full" message at stage 7150 through the Display Text Proactive Command 3090. At stage 7135, if User 2 selects "Do not Add" or "Do not Update", then the User 2 application module 2091 will go to stage 7150. At stage 7150, User 2 will be prompted to send her contact information back to the User 1. This action will be substantially the same Send Profile process described above in FIG. 6E for User 1. The User 2 contact information stored in the MyProfile Data File 2085 will be sent to User 1.

Upon completion of the "Send Profile" process, the User 2 application module 2091 sends the following message to the display control module 2057: "Preparing to refresh SIM . . . ". At this time, at stage 7155, the User 2 application module 2091 deletes the SMS message from the User 2 (U)SIM Card 2080. At stage 7160, the User 2 phone 2050 is asked to perform the SIM refresh function through the SIM Refresh Proactive Command 3120 and a message specific to the handset may be displayed on the screen (e.g. Refreshing SIM). If there is an error with the SIM refresh operation, stage 7165, a message will be displayed on the User 2 phone display 2057 "Restart Phone to refresh your SIM phonebook". At stage 7175, the User 2 application module 2091 will ask the User 2 phone 2050 to display "SIM phonebook ready" through the Display Text Proactive Command 3090.

Figure 8A:
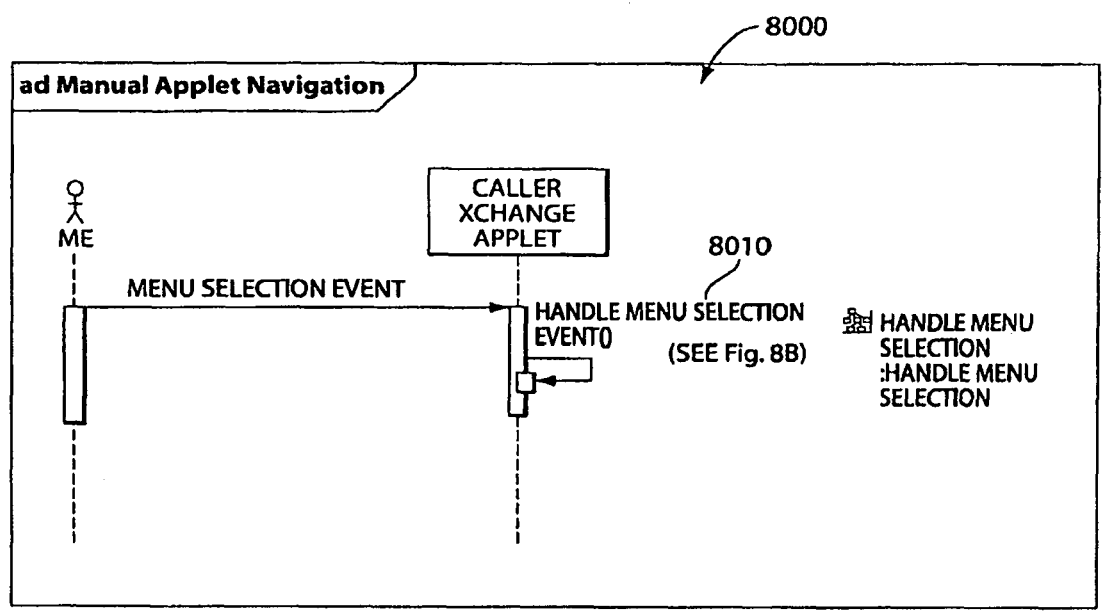
FIGS. 8A-8F are data flow charts of subsystems of a communication system according to one embodiment of the invention

Referring to FIG. 8A, a manual application navigation is available to User 1 and to User 2. When User 1 selects to operate application module 2090 within the User 1 phone 2010, the Menu Selection Event 3040 is triggered to activates the User 1 application module 2090.

Figure 8B:
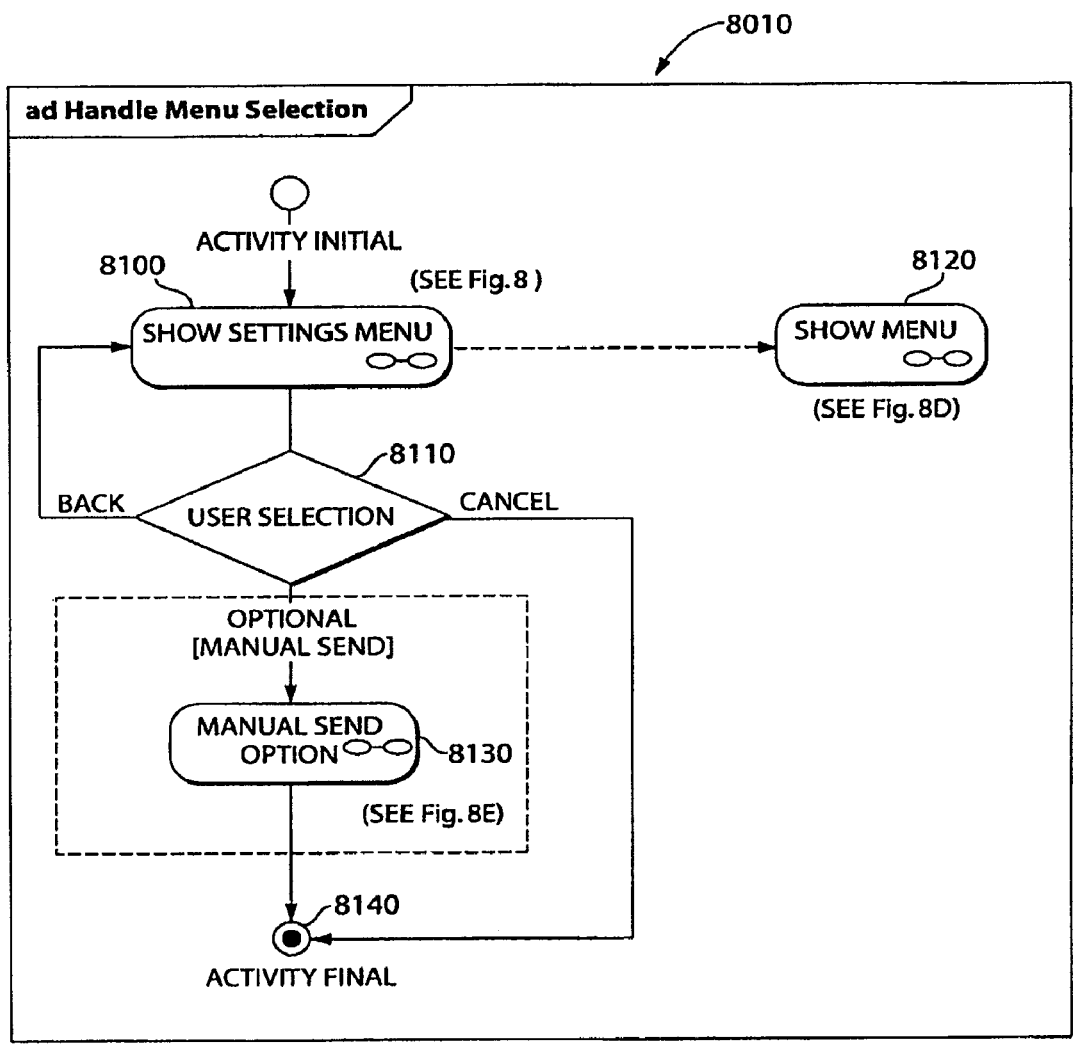

Referring also to FIG. 8B, a Settings Menu selection process 8010 is shown. When menu selection Event 3040 is triggered, the User 1 application module 2090 shows the Settings Menu, stage 8100 (see FIG. 8C and associated description). At stage 8110, User 1 selects one of the menu items and the User 1 application module 2090 triggers the related action.

Figure 8C:
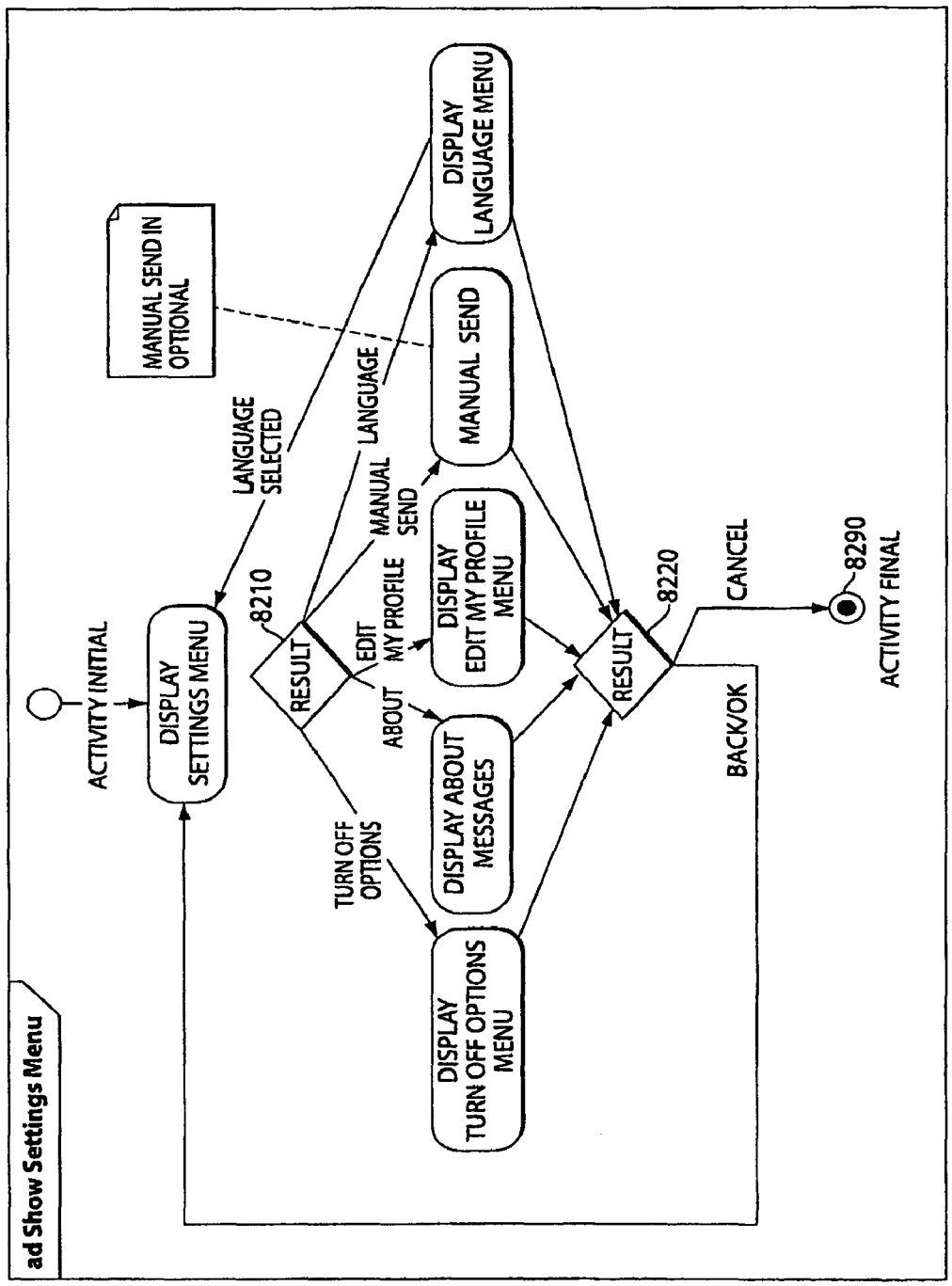

Referring also to FIG. 8C, settings is a menu that allows User 1 to change the User 1 application module 2090 defaults. The settings menu can be accessed by User 1 during the following usage flows: Send MyProfile after a call, Update MyProfile after a call, Add Caller to phonebook, Update Caller in phonebook, manual send to a new user, or Manual navigation to the SIM applications. At stage 8110, User 1 has the following choices within the settings menu: "Turn off Options", "Edit MyProfile", "Manual Send", "Language" and "About". When User 1 makes a choice at stage 8220, the application triggers the related action and when completed, the application goes back to the settings menu. The Turn off Options Menu provides the ability to disable or enable the Sending and Adding features. The Disable Send feature allows User 1 to turn on/off the "Send MyProfile?" feature. If this featured is disabled, User 1 will not be asked to Send his contact information (stored in the User 1 MyProfile Data File 2035) after phone calls. The default value for the Send feature is "enabled". The Disable Add feature allows User 1 to turn on/off the "Add [CALLER] to SIM phonebook?" message and feature. If this featured is disabled, User 1 will not be asked to Add a caller to the SIM phonebook 2033 if an application module 2090 SMS is received. The default value for the Add feature is "Enabled".

Figure 8D:
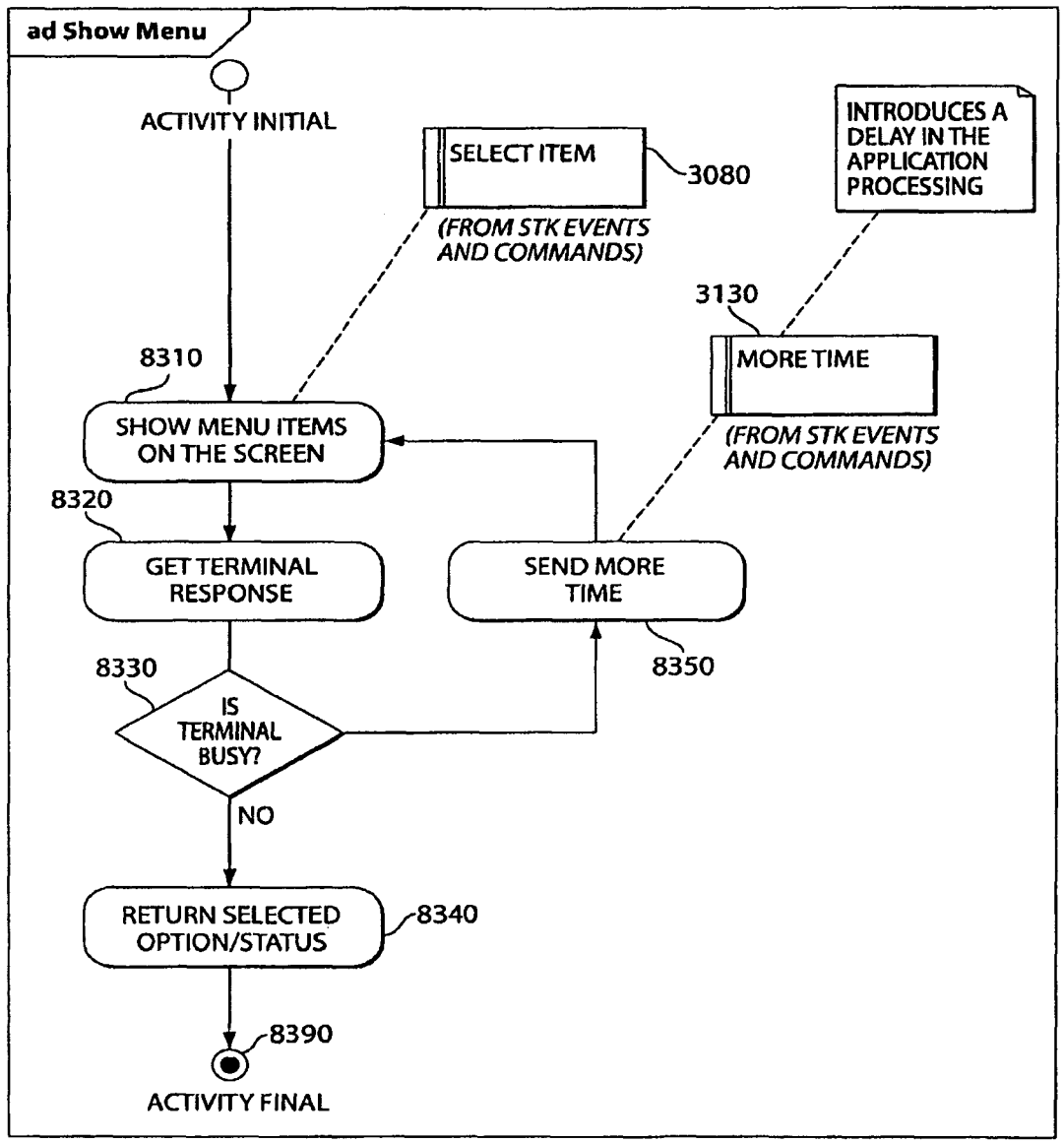

Referring to FIG. 8D, the User 1 application module 2090 menu page is set to active, and the User 1 is presented with options. At stage 8310, the User 1 application module 2090 displays the available options. In order to make sure that the application does not intercept another phone 2010 activity, the module checks with the terminal by getting terminal response, at stage 8320. If the terminal is not busy, at stage 8330, the module 2090 returns to stage 8310 and continues to show the menu items on the phone 2010 display module 2017. The User 1 application module 2090 can issue a Time Proactive Command 3130 to continue displaying the application menu. If the terminal is not busy, at stage 8330, the User 1 application module 2090 returns the selected option from the Menu.

Figure 8E:
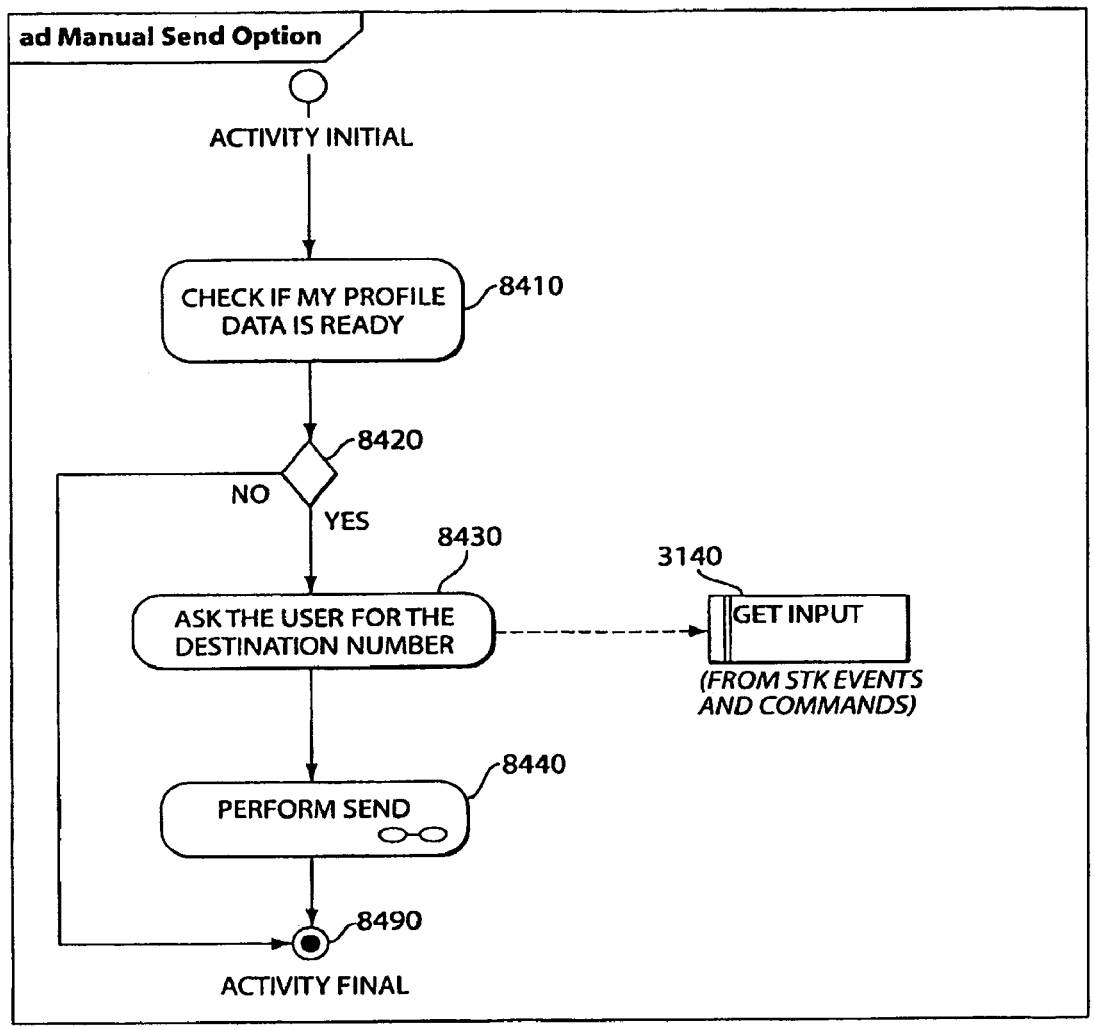

Referring to FIG. 8E, a Manual Send option within the Settings Menu is available. If User 1 selects the Manual Send Option, at stage 8410, the User 1 application module 2090 checks if the User 1 MyProfile Data File 2035 is ready. At stage 8420, if the User 1 MyProfile Data File 2035 is ready, the User 1 application module 2090 asks User 1 to enter the User 2 destination phone number by triggering the Get Input Proactive Command 3140. The User 2 phone number is entered. The User 1 application module 2090 performs a Send process as, as described in FIG. 6E.

Figure 8F:
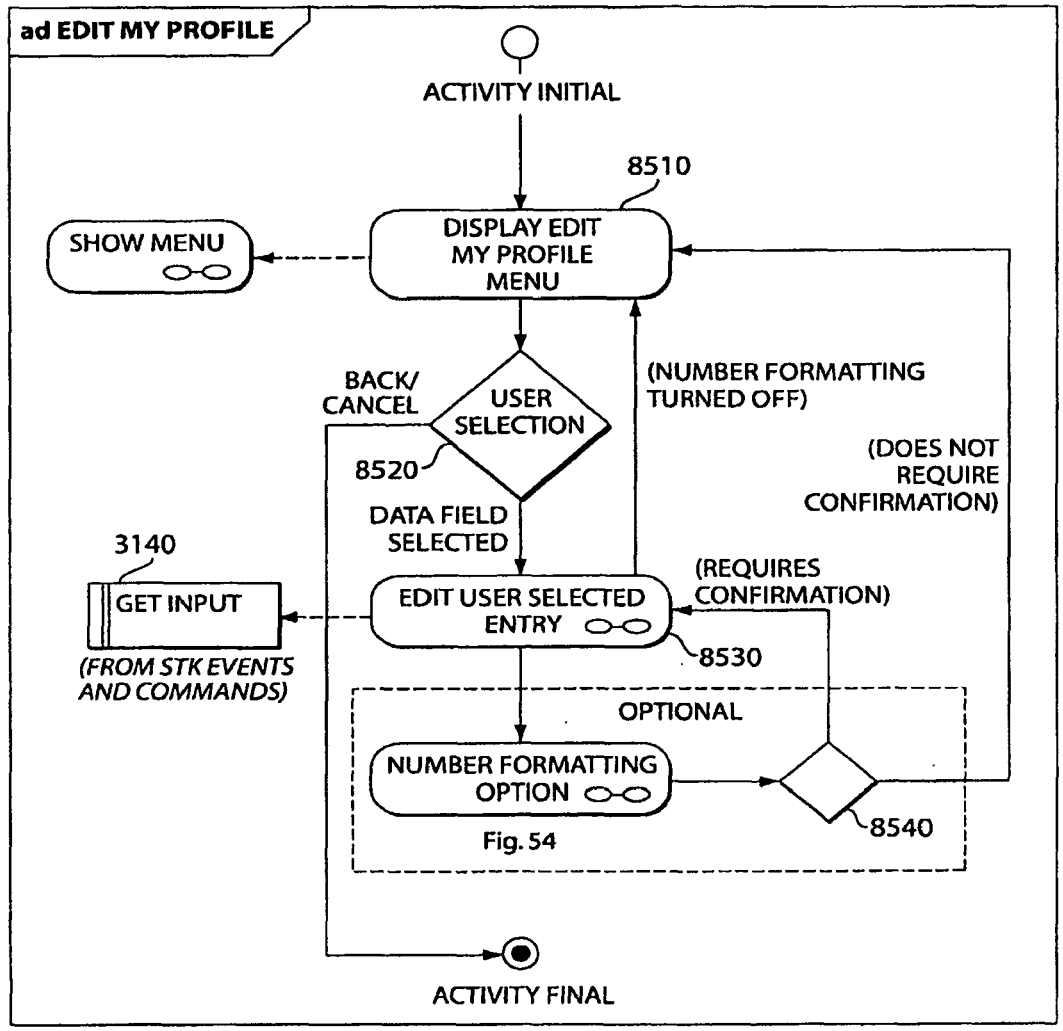

Referring to FIG. 8F, the Edit MyProfile option within the Settings Menu is described. If User 1 selects the Edit MyProfile Option, at stage 8510, the User 1 application module 2090 displays the Edit MyProfile menu. The MyProfile menu contains the User 1 contact information in a sub-menu. The data, as stored in the MyProfile Data File 2035, is the information that is sent to other users. The default available options are First name, Last Name, Mobile Number, Home Number, and Work Number. The field of data and options are not limited only to these numbers and can be extended by extending the application module 2090 code.

The "Language" function allows User 1 to change the language of the User 1 application module 2090. The number and types of language options are determined by the Mobile Operator, for example. The default language can be set by the operator during implementation, coded into the User 1 application module 2090 or changed through an OTA update of the User 1 Configuration File 2039.

The "About" function provides a brief description of the User 1 application module 2090 and the version information to User 1. The About function also displays the Operation Mode, a metric used to determine in what mode the handset is allowing the User 1 application module 2090 to operate.

Referring to FIGS. 2-8, the "Send Update" function allows the User 1 application module 2090 to automatically update the User 1 contact information in the User 2 phonebook (and other users' phonebooks). The Send Update action can be triggered by an outgoing call or by an incoming User 1 application module 2090 SMS communication, for example. The User 1 application module 2090 performs the Send process, e.g., in FIG. 6E. The system and the methods used for "Update" is substantially the same as the "Send" process. The frequency of the "Send Update?" query is controlled by the User 1 LND Counter Data File 2037. Each LND Counter Data is tied to the phone call destination number or SMS origination phone number. In order to prevent repetitive send requests for frequent callers, the User 1 LND Counter Data File 2037 tracks the number of outgoing calls for each unique destination address. The send query is asked after the User 1 LND Counter Data, for a given destination address, reaches the Base Threshold Value. User 1 may change information in the MyProfile Data File 2035 and the counters reset process is triggered. A change to Personal information (Name, Mobile or Home number) resets the LND counters for all the contacts who have previously received Personal information. A change to Business information (Name, Mobile or Work number) resets the LND counters for the contacts who have previously received Business information. A change to both Personal and Business information resets all the counters. Once the counter for a given contact is reset, a subsequent call to this contact triggers contact information exchange.

The "Receive Update" function is configured to allow the User 2 application module 2091 to receive a SMS message that contains the caller's contact information with the updated information. The User 2 application module 2091 activates and asks User 2 to "Update User 1?". User 2 has three options "Yes", "No", "Settings", according to the "Receive" process described in FIG. 7A-7B. If the User 2 selects "Yes" the User 2 contact data entry in the User 2 UICC Phonebook 2083 is updated and a message is displayed, such as: "User 2 updated in SIM phonebook." If the User 2 selects "No", then the User 2 UICC Phonebook 2083 is unchanged.

Figure 9:
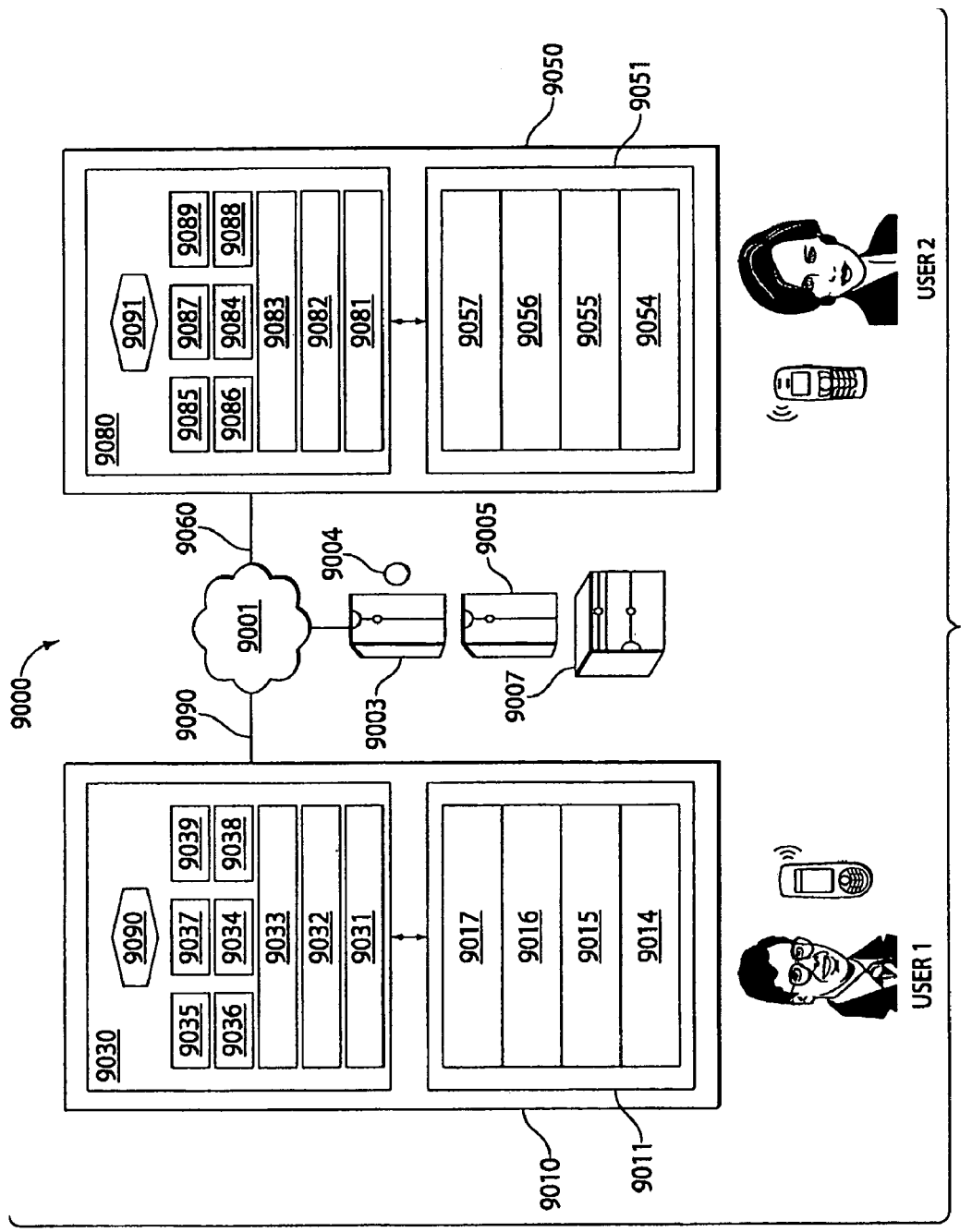
FIG. 9 is a schematic diagram of a communication system according to one embodiment of the invention.

Referring to FIG. 9, a mobile contact information management system 9000 includes components and their connectivity to several devices within a Network, such as a UMTS Network. A mobile contact management information system 9000 includes a first user phone 9010, a second user phone 9050, a remote computer 9003, a remote database server 9005, switches 9007, a Switch Communication Application 9004 and a Mobile Operator Over The Air (OTA) platform 9001, as well as other servers and databases servers.

The Mobile Operator remote computer 9003 remote database 9005 and the switches 9007 are coupled to each other. The first user phone 9010 and the second user phone 9050 are configured to communicate over the Mobile Operator OTA Platform 9001. The OTA platform connects the first user phone 9010 and the second user phone 9050 to the remote computer 9003 and remote database server 9005 over the mobile network. In FIG. 9, the first user phone 9010 contains a UICC card 9030 and the second user phone 9050 contains a UICC card 9080 that enables the first user phone 9010 and the second user phone 9050 access to the remote server 9003 and the remote database 9005 over the mobile network, OTA Platform 9001 and the phone operator network. The UICC cards 9030, 9080 can be integrated into the phone and phone operating system software.

The first user UICC card 9030 contains a (U)SIM application module 9090, a Javacard 9031, a SIM Tool Kit (STK) framework 9032, and a first user UICC card phonebook 9033. In addition, the following files are stored in the SIM File System: a first user MyProfile Data File 9035, a first User Last Number Dialed (LND) data file 9037, a first User LND Pattern data file 9038, a first User Operations Mode data file 9034, and a first User Configuration File 9039. These files can be changed locally or remotely via an OTA update. The first user phone 9010 further includes a phone operating system 9011. The first user phone operating system 9011 includes a display control module 9017, a phonebook module 9015, a phone event management communication module 9014, and a SMS module 9016. Other modules may also be included.

The second user UICC card 9080 contains a (U)SIM application module 9090, a Javacard 9081 and a SIM Tool Kit (STK) framework 9082, a second user UICC card phonebook 9083. The following files are stored in the SIM File System: a second user MyProfile Data File 9085, a second User Last Number Dialed (LND) data file 9087, a second User LND Pattern data file 9088, a second User Operations Mode data file 9084, and a second User Configuration File 9089. These files can be changed locally or remotely via an OTA update. The second user phone 9050 further includes a phone operating system 9051. The second user phone operating system 9051 includes a display control module 9057, a phonebook module 9055, a phone event management communication module 9054, and a SMS module 9056. Other modules may be included.

User 1 places a call with the first phone 9010 to the second user phone 9050 via the Mobile Operator, stages 9090 and 9060. The switch 9007 informs the Switch Communication Application 9004 within the remote computer 9003 regarding the caller's phone numbers. The Switch Communication Application 9004 creates two SMS messages: The first SMS message is send to the User 1 phone 9010, a second message is send to the User 2 phone 9050. In each instance, the (U)SIM application module 9090 in the first user UICC card 9030 and the (U)SIM application module 9090 in the second user UICC card 9080 is triggered by the SMS messages. The applet triggering events is replaced within the User 1 phone 9010 and the User 2 phone 9050. At the end of each call the (U)SIM application module 9090 for User 1 and User 2 will be activated to query each user to Send contact information.

Alternatively, the User 1 MyProfile Data File 9035, the User 1 Last Number Dialed (LND) data file 9037, the User 1 LND Pattern data file 9038, the User 1 User Operations Mode data file 9034, and the User 1 Configuration File 9039 can be replaced with a web interface within the remote computer 9003 and a logic within the remote database server 9005 over the mobile network. With continued reference to FIG. 9, User 1 places a call with the mobile phone 9010 to the User 2 phone 9050 via the Mobile Operator, as shown in stage 9090 and 9060. The switch 9007 informs the Switch Communication Application 9004 within the remote computer 9003 regarding User 1's phone numbers. The Switch Communication Application 9004 creates two SMS messages: The first SMS message is sent to the User 1 phone 9010, and a second message is send to the User 2 phone 9050. The (U)SIM application module 9090 in the first user UICC card 9030 and the (U)SIM application module 9090 in the second user UICC card 9080 is triggered by the SMS messages. Using this methodology will not only replace the applet triggering events within the User 1 phone 9010 and the User 2 phone 9050, but also the location process logic to the remote computer 9003 and the remote database server 9005. The information related to User 1 and User 2, such as MyProfile Data, Last Number Dialed Data, LND Data Pattern, User Operation Mode, and the list of contacts within the Address Book are stored within the remote database server 9005. At the end of each call the (U)SIM application module 9090, 9091 for User 1 and User 2 will be activated and ask each user to Send contact information.

Figure 10:
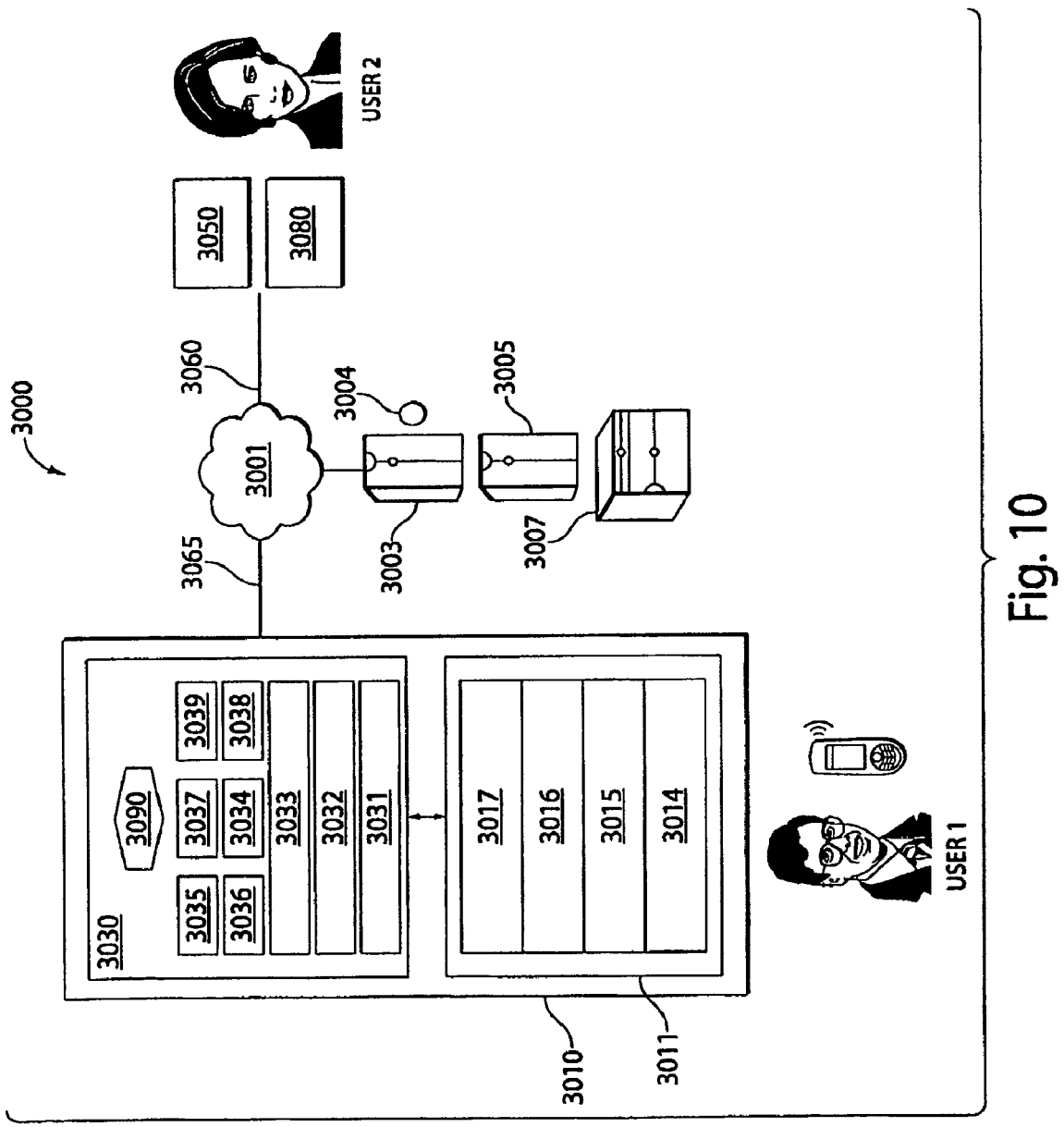
FIG. 10 is a schematic diagram of a communication system according to one embodiment of the invention.

Referring to FIG. 10, the mobile contact information management system 3000 illustrates the components of invention and their connectivity to several devices between Networks, such as an UMTS Network and a Fixed Line (Land Line) Network. A mobile contact management information system 3000 includes a first user phone 3010, a second user fixed line phone 3050, a second user computer 3080, a remote computer 3003, a remote database server 3005, switches 3007, a Switch Communication Application 3004 and a Mobile Operator Over The Air (OTA) platform 3001, a Fixed Line Network 3060 as well as other servers and databases servers.

The Mobile Operator remote computer 3003, the remote database 3005 and the switches 3007 are coupled to each other. The first user fixed line phone 3050 is connected to the Mobile Operator OTA Platform 3001. The second user fixed line phone 3050 is connected to the Fixed Line Network 3060. The second user computer 3080 is connected to the remote computer 3003 and to the remote database server 3005 through the Internet or other network. The OTA platform connects the first user phone 3010 to the remote computer 3003 and the remote database server 3005 over the mobile network. The first user phone 3010 contains an UICC card 3030 that enables the first user phone 3010 access to the remote server 3003 and remote database 3005 over the mobile network, OTA Platform 3001 and phone operator network. The UICC card 3080 can be integrated into the phone and phone operating system software.

The UICC card 3030 contains a (U)SIM application module 3090, a Javacard 3031 and a SIM Tool Kit (STK) framework 3032, a first user UICC card phonebook 3033. In addition, the following files are stored in the SIM File System: a first user MyProfile Data File 3035, a first User Last Number Dialed (LND) data file 3037, a first User LND Pattern data file 3038, a first User Operations Mode data file 3034, and a first User Configuration File 3039. These files can be changed locally or remotely via an OTA update. The first user phone 3010 further includes a phone operating system 3011. The first user phone operating system 3011 includes a display control module 3017, a phonebook module 3015, a phone event management communication module 3014, and a SMS module 3016 and other modules. The second user fixed line phone 3050 can be a standard fixed line phone or a VoIP phone or a next generation digital phone.

The second user contact information is stored in the remote computer 3003 coupled to the remote database server 3005. The second user may have access privileges to the remote computer through the Internet to, for example, change contact information which is stored within remote database server 3005.

According to FIG. 10, User 1 places a call with the mobile phone 3010 to the User 2 phone 3050 via the Mobile Operator, as shown in stage 3065, and via the Fixed Line Network as shown in stage 3060. The switch 3007 informs the Switch Communication Application 3004 within the remote computer 3003 regarding the User 1's phone numbers. The Switch Communication Application 3004 informs the remote computer 3003 coupled to the remote database server 3005. The remote computer 3003 retrieves the User 2 contact data from remote database 3005, then packages the User 2 contact data and inserts the information into an SMS message. The SMS message is sent to the User 1 phone 3010. In this instance, the (U)SIM application module 3090 in the first user UICC card 3030 is triggered by the SMS message in "Receive" mode. Using substantially the same application module 3090, User 1 inserts User 2 contact data in the User 1 UICC card phonebook 3033. The remote computer 3003 coupled to the remote database server 3005 stores User 1's phone number within a Call List in the User 2 remote database 3003 account. User 2 changes her information within the remote computer 3003 coupled to the remote database server 3005. Remote computer 3003 retrieves User 2's updated contact data from the remote database 3005, and packages new User 2 contact data and inserts the information into an SMS message. The SMS message is sent to the User 1 phone 3010. In this instance, the (U)SIM application module 3090 in the first user UICC card 3030 is triggered by the SMS message in "Receive" mode. Using exactly the same application module 3090 and methodologies, User 1 will be able to insert User 2's updated contact data in the User 1 UICC card phonebook 3033.

A reporting system for the contact management system 2000, 3000, 9000 can be included. The (U)SIM application module 2090 prepares and sends usage reports to a remote computer 2003 and a remote database 2005. The (U)SIM Application 2090 gathers usage data and sends information periodically to the remote computer 2003 and a remote server 2005. The information collected includes, but is not limited to, total number of incoming calls, total number of contacts in the phonebook, total number of personal contact information updates with in a time period. The information collected in the remote database 2005 can be used to analyze usage statistics and characteristics.

Embodiments of the invention describe wireless transfer of data from a first mobile user to a second mobile user over a network. Using the methods and systems described herein, data can be transferred via Bluetooth® technology, infrared or other wireless technology that allow communication from one device to another.

The methods and systems of embodiments of the present invention described above allow users to exchange business and personal contact information to other users over a mobile network. In other embodiments, businesses may use contact information systems of the present invention to provide data exchange between the customers, vendors, or others. In other embodiments, mobile operators may use the present invention to provide a mobile yellow pages or white pages directory between the customers, vendors, merchants or others. Further, embodiments of the invention describe the exchange of contact information. Other information can be exchanged between the users, customers, vendors or others. For example, information such as photos, ring tones, other audio or visual information, music files and other information can be exchanged via the apparatus and systems described herein.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

The invention claimed is:

1. A contact information management system for operation over a network and for automatically sending and receiving contact information between a first user of a first user device and a second user of a second user device, the system comprising:

a server comprising a memory that stores computer readable instructions that, when executed by the server, cause the server to:
- communicate over the network with the first user device and the second user device;
- detect a communication event relating to a communication between the first and second user devices;
- obtain caller identification information related to the second user device;
- cause the triggering of a prompt on the first user device, the prompt requesting permission from the first user to send contact information stored in a memory and relating to the first user to the second user device, the permission is requested after the occurrence of the communication event;
- cause the first user device to send an indication that permission to send contact information was obtained from the first user;
- retrieve contact information stored in the memory; and
- cause the sending of the contact information retrieved from the memory over the network to the second user device after permission is obtained from the first user, the sending of the contact information includes the use of the obtained caller identification information related to the second user device.

2. The contact information management system of claim 1, the computer readable instructions being further configured to cause the server to cause second user device to prompt the second user to store the contact information associated with the first user in the second user device.

3. The contact information management system of claim 1, the computer readable instructions being further configured to cause the server to cause first user device to prompt the first user to update contact information stored in the memory.

4. The contact information management system of claim 1, the computer readable instructions being further configured to cause the server to cause the sending of an updated information message to the second user device to update the contact information associated with the first user in the second user device.

5. The contact information management system of claim 1, the computer readable instructions being further configured to cause server to cause the second user device to prompt the second user to store updated contact information in the second user device.

6. The contact information management system of claim 1, the computer readable instructions being further configured to cause the server to determine whether the caller identification information relates to a mobile device call identifier.

7. The contact information management system of claim 1, the computer readable instructions being further configured to cause the server to determine a frequency of communications between the first user device and the second user device.

8. The contact information management system of claim 7, the computer readable instructions being further configured to cause the server to, when the frequency of the communications between the first user device and the second user device exceeds a threshold, cause the first user device to prompt the first user to send updated the contact information stored in the server.

9. The contact information management system of claim 1, the computer readable instructions being further configured to cause the server to cause first user device to allow entry of a permission level for the contact information stored in the server.

10. The contact information management system of claim 9, the computer readable instructions being further configured to cause the server to send information associated with the first user device that corresponds to the permission level to the second user device.

11. The contact information management system of claim 9, the computer readable instructions being further configured to cause the server to store the permission level that corresponds to the second user device.

12. The contact information management system of claim 11, the computer readable instructions being further configured to cause the server to store a sent record to indicate at least one of a time of sent data, a destination number and a permission level.

* * * * *